United States Patent
Jin et al.

(10) Patent No.: US 12,207,180 B2
(45) Date of Patent: Jan. 21, 2025

(54) COMMUNICATION METHOD AND APPARATUS

(71) Applicant: HUAWEI TECHNOLOGIES CO., LTD., Guangdong (CN)

(72) Inventors: Yinghao Jin, Boulogne Billancourt (FR); Chenchen Yang, Ottawa (CA); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 325 days.

(21) Appl. No.: 17/480,578

(22) Filed: Sep. 21, 2021

(65) Prior Publication Data

US 2022/0007274 A1    Jan. 6, 2022

Related U.S. Application Data

(63) Continuation of application No. PCT/CN2020/079585, filed on Mar. 17, 2020.

(30) Foreign Application Priority Data

Mar. 21, 2019    (CN) .......................... 201910215478.9

(51) Int. Cl.
    *H04W 48/16*    (2009.01)
    *H04W 48/10*    (2009.01)
(52) U.S. Cl.
    CPC ........... *H04W 48/16* (2013.01); *H04W 48/10* (2013.01)

(58) Field of Classification Search
    CPC .............................. H04W 48/16; H04W 48/10
    See application file for complete search history.

(56) References Cited

U.S. PATENT DOCUMENTS

| | | | | |
|---|---|---|---|---|
| 2015/0195774 | A1* | 7/2015 | Lee | H04W 48/12 |
| | | | | 370/312 |
| 2019/0014515 | A1* | 1/2019 | Zee | H04W 48/18 |
| 2019/0387393 | A1* | 12/2019 | Xu | H04W 60/00 |
| 2020/0120580 | A1* | 4/2020 | Jin | H04W 48/02 |
| 2020/0275279 | A1* | 8/2020 | Tangudu | H04W 8/06 |

(Continued)

FOREIGN PATENT DOCUMENTS

| CN | 107919969 A | 4/2018 |
|---|---|---|
| CN | 108366365 A | 8/2018 |

(Continued)

OTHER PUBLICATIONS

3GPP TS 37.340 V15.4.0 (Dec. 2018), "3rd Generation Partnership Project; Technical Specification Group Radio Access Network; Evolved Universal Terrestrial Radio Access (E-UTRA) andNR; Multi-connectivity; Stage 2 (Release 15)," Dec. 2018, 68 pages.

(Continued)

*Primary Examiner* — Barry W Taylor
(74) *Attorney, Agent, or Firm* — Fish & Richardson P.C.

(57) ABSTRACT

The present disclosure relates to communication methods and apparatus. One example method includes obtaining, by a first access network device, a non-public network (NPN) identifier of an NPN supported by the first access network device, and sending, by the first access network device, a (Continued)

second message to a terminal device, where the second message is used to indicate the NPN identifier of the NPN supported by the first access network device.

20 Claims, 7 Drawing Sheets

(56) References Cited

U.S. PATENT DOCUMENTS

| | | | |
|---|---|---|---|
| 2020/0288384 A1* | 9/2020 | Li | H04W 24/02 |
| 2020/0296663 A1* | 9/2020 | Lou | H04W 48/18 |
| 2020/0374947 A1* | 11/2020 | Jin | H04W 28/0278 |
| 2021/0195401 A1* | 6/2021 | Cao | H04W 76/11 |
| 2021/0297937 A1* | 9/2021 | Baek | H04W 48/12 |
| 2021/0385742 A1* | 12/2021 | Liao | H04W 48/02 |
| 2021/0400448 A1* | 12/2021 | Adjakple | H04W 4/40 |
| 2022/0110009 A1* | 4/2022 | Liu | H04W 24/04 |
| 2022/0286922 A1* | 9/2022 | Chen | H04W 36/0061 |
| 2022/0417834 A1* | 12/2022 | Liu | H04W 12/06 |

FOREIGN PATENT DOCUMENTS

| | | |
|---|---|---|
| CN | 108924926 A | 11/2018 |
| CN | 109041138 A | 12/2018 |
| CN | 109151906 A | 1/2019 |
| CN | 109257815 A | 1/2019 |
| CN | 109429277 A | 3/2019 |
| CN | 109474967 A | 3/2019 |
| KR | 20180032461 A | 3/2018 |
| WO | 2017166988 A1 | 10/2017 |
| WO | 2018036341 A1 | 3/2018 |
| WO | 2018137866 A1 | 8/2018 |

OTHER PUBLICATIONS

EPO Partial Supplementary European Search Report issued in European Application No. 20774636.3 on Feb. 23, 2022, 15 pages.
Ericsson, "KI#2 in TR 33.809-updated details (cleanup)," 3GPP TSG-SA WG3 Meeting #94 Ad-Hoc, S3-190831, Stockholm, Sweden, Mar. 11-15, 2019, 4 pages.
Intel Corporation, "RAN2 impact on Non-Public Network Deployment using SNPN," 3GPP TSG RAN WG2 Meeting #105, R2-1900760, Athens, Greece, Feb. 25-Mar. 1, 2019, 6 pages.
Nokia Siemens Networks et al., "Introduction of 3G HNB support," 3GPP TSG-RAN WG3 Meeting #60, R3-081321, Kansas City, Missouri, USA, May 5-9, 2008, 140 pages.
Qualcomm Incorporated, "Resolution of Editor's notes for non-public networks," 3GPP SA WG2 Meeting S2#131, S2-1902100, Tenerife, Spain, Feb. 25-Mar. 1, 2019, 4 pages.
Nec, "New Key Issue on Privacy aspects for NPN," 3GPP TSG SA WG3 (Security) Meeting #94, S3-190346, Kochi, India, Jan. 28-Feb. 1, 2019, 2 pages.
Office Action issued in Chinese Application No. 201910215478.9 on Mar. 21, 2022, 5 pages.
Office Action issued in Chinese Application No. 201910215478.9 on Mar. 31, 2021, 21 pages (with English translation).
Office Action issued in Chinese Application No. 201910215478.9 on Aug. 11, 2021, 24 pages (with English translation).
PCT International Search Report and Written Opinion issued in International Application No. PCT/CN2020/079585 on Jun. 15, 2020, 15 pages (with English translation).

* cited by examiner

COMMUNICATION METHOD AND APPARATUS

CROSS-REFERENCE TO RELATED APPLICATIONS

This application is a continuation of International Application No. PCT/CN2020/079585, filed on Mar. 17, 2020, which claims priority to Chinese Patent Application No. 201910215478.9, filed on Mar. 21, 2019. The disclosures of the aforementioned applications are hereby incorporated by reference in their entireties.

TECHNICAL FIELD

This application relates to the communication field, and more specifically, to a communication method and apparatus.

BACKGROUND

To meet requirements of vertical industries in the future, a concept of private networks, namely, private networks for the vertical industries, is proposed, and the private networks are dedicated to serving users in the vertical industries. The private networks have two architectures: standalone (standalone) and non-standalone (non-standalone). The standalone and a public network architecture are networks independent of each other and have independent network element functions. The non-standalone is the same as the public network architecture.

Both a standalone non-public network (non-public network, NPN) and a non-standalone non-public network need to support a closed access group (Closed Access Group, CAG) operation. To be specific, a user not belonging to an NPN needs to be prevented from accessing the NPN network, and a user of the NPN can access a corresponding network to obtain a corresponding service.

For the non-standalone NPN network, a network slicing manner may be used to implement the NPN network, that is, each NPN network corresponds to one network slice. However, a CAG requirement cannot be met in a current network slicing manner, that is, the user not belonging to the NPN cannot be forbidden to access the network.

SUMMARY

This application provides a communication method and apparatus, to ensure user access.

According to a first aspect, a communication method is provided. The method includes: A terminal device receives a first message from a core network device, where the first message includes a correspondence between network slice NS indication information of an NS supported by the terminal device and a non-public network NPN identifier of an NPN supported by the terminal device; the terminal device receives a second message from a first access network device, where the second message is used to indicate an NPN identifier of an NPN supported by the first access network device; and the terminal device determines an NS supported by the first access network device.

The terminal device receives the NPN that is supported by the first access network device and that is sent by the first access network device and the correspondence between the NPN and the NS that are supported by the terminal device, so that the terminal device can determine the NS that can be accessed by the terminal device. In this way, a user that can access the NS can access the NS, a user that cannot access the NS is forbidden to access the NS, so that the terminal device performs a corresponding service request in a corresponding NS.

According to a second aspect, a communication method is provided. The method includes: A terminal device receives a first message from a core network device, where the first message includes a correspondence between network slice NS indication information of an NS supported by the terminal device and a closed access group CAG identifier of a CAG supported by the terminal device; the terminal device receives a second message from a first access network device, where the second message is used to indicate a CAG identifier of a CAG supported by the first access network device; and the terminal device determines an NS supported by the first access network device.

The terminal device receives the CAG that is supported by the first access network device and that is sent by the first access network device and the correspondence between the CAG and the NS that are supported by the terminal device, so that the terminal device can determine the NS that can be accessed by the terminal device. In this way, a user that can access the NS can access the NS, a user that cannot access the NS is forbidden to access the NS, so that the terminal device performs a corresponding service request in a corresponding NS.

With reference to the first aspect or the second aspect, in a possible implementation, the method further includes: The terminal device receives a system message SIB from the first access network device, where the SIB includes identification information of a cell, and the cell is a neighboring cell of a cell on which the terminal device camps.

The terminal device may learn of, by using the SIB sent by the first access network device, the neighboring cell of the cell on which the terminal device camps.

With reference to the first aspect or the second aspect, in a possible implementation, the SIB further includes the NPN identifier corresponding to the cell or the CAG identifier corresponding to the cell.

The terminal device may learn of, by using the SIB sent by the first access network device, an NPN or a CAG supported by the neighboring cell of the cell on which the terminal device camps, to provide more service requests in the NS for the terminal device.

With reference to the first aspect or the second aspect, in a possible implementation, the SIB further includes capability information of a second access network device, the capability information is used to indicate capability information of whether the second access network device can be used as a secondary access network device, and the second access network device is an access network device in which the cell is located.

The terminal device may learn of, by using the capability information of the second access network in the SIB sent by the first access network device, whether the second access network device can provide a corresponding service requirement for the terminal device.

According to a third aspect, a communication method is provided. The method includes: A first access network device obtains a non-public network NPN identifier of an NPN supported by the first access network device and the first access network device sends a second message to a terminal device, where the second message is used to indicate the NPN identifier of the NPN supported by the first access network device.

The first access network device sends the NPN supported by the first access network device to the terminal device, so that the terminal device determines an NS corresponding to the NPN supported by the first access network device.

According to a fourth aspect, a communication method is provided. The method includes: A first access network device obtains a closed access group CAG identifier of a CAG supported by the first access network device; and the first access network device sends a second message to a terminal device, where the second message is used to indicate the CAG identifier of the CAG supported by the first access network device.

The first access network device sends the CAG supported by the first access network device to the terminal device, so that the terminal device determines an NS corresponding to the CAG supported by the first access network device.

With reference to the third aspect or the fourth aspect, in a possible implementation, the method further includes: The first access network device sends a system message SIB to the terminal device, where the SIB includes identification information of a cell, and the cell is a neighboring cell of a cell on which the terminal device camps.

The first access network device sends the neighboring cell of the cell on which the terminal device camps to the terminal device, so that the terminal device can request more services in the NS.

With reference to the third aspect or the fourth aspect, in a possible implementation, the SIB further includes the NPN identifier corresponding to the cell or the CAG identifier corresponding to the cell.

The first access network device sends the NPN or the CAG supported by the neighboring cell of the cell on which the terminal device camps, so that the terminal device determines a service of the NS that can be requested by the terminal device.

With reference to the third aspect or the fourth aspect, in a possible implementation, the SIB further includes capability information of a second access network device, the capability information is used to indicate capability information of whether the second access network device can be used as a secondary access network device, and the second access network device is an access network device in which the cell is located.

The first access network device sends the capability information of the second access network, so that the terminal device learns of whether the second access network device can provide a corresponding service requirement for the terminal device.

According to a fifth aspect, a communication method is provided. The method includes: A first access network device sends an interface setup request to a core network device, where the interface setup request includes a correspondence between network slice NS indication information of an NS supported by the first access network device and a non-public network NPN identifier of an NPN supported by the first access network device; and the first access network device receives an interface setup response sent by the core network device, where the interface setup response includes an NPN identifier of an NPN supported by the core network device.

The first access network device uses the NPN identifier of the NPN supported by the core network device, so that the first access network device determines or modifies the NPN identifier of the NPN supported by the first access network device, to provide more service requirements in the NS for the terminal device.

According to a sixth aspect, a communication method is provided. The method includes: A first access network device sends an interface setup request to a core network device, where the interface setup request includes a correspondence between network slice NS indication information of an NS supported by the first access network device and a closed access group CAG identifier of a CAG supported by the first access network device; and the first access network device receives an interface setup response sent by the core network device, where the interface setup response includes a CAG identifier of a CAG supported by the core network device.

The first access network device uses the NPN identifier of the NPN supported by the core network device, so that the first access network device determines or modifies the CAG identifier of the CAG supported by the first access network device, to provide more service requirements in the NS for the terminal device.

With reference to the fifth aspect or the sixth aspect, in a possible implementation, the method further includes: The first access network device receives a session resource setup request sent by the core network device, where the session resource setup request includes a registered user of an NS corresponding to the session.

The first access network device may learn of, by using the registered user of the NS corresponding to the session sent by the core network, the registered user of the NS corresponding to the session, so that the first access network device determines whether a service of the NS corresponding to the session can be provided.

With reference to the fifth aspect or the sixth aspect, in a possible implementation, the method further includes: The first access network device sends an additional request to a second access network device, where the additional request includes a registered user of an NS corresponding to the session.

The second access network device may learn of, by using the registered user of the NS corresponding to the session sent by the first access network device, the registered user of the NS corresponding to the session, so that the second access network device determines whether a service of the NS corresponding to the session can be provided.

According to a seventh aspect, a communication method is provided. The method includes: A core network device receives an interface setup request sent by a first access network device, where the interface setup request includes a correspondence between network slice NS indication information of an NS supported by the first access network device and a non-public network NPN identifier of an NPN supported by the first access network device; and the core network device sends an interface setup response to the first access network device, where the interface setup response includes an NPN identifier of an NPN supported by the core network device.

The core network device obtains the correspondence between the NS indication information of the NS supported by the first access network device and the NPN identifier of the NPN supported by the first access network device, and sends the NPN identifier of the NPN supported by the core network device to the first access network device, so that the first access network device determines or modifies the NPN identifier of the NPN supported by the first access network device, to provide more service requirements in the NS for the terminal device.

According to an eighth aspect, a communication method is provided. The method includes: A core network device receives an interface setup request sent by a first access network device, where the interface setup request includes a correspondence between network slice NS indication information of an NS supported by the first access network device and a closed access group CAG identifier of a CAG supported by the first access network device; and the core network device sends an interface setup response to the first access network device, where the interface setup response includes a CAG identifier of a CAG supported by the core network device.

The core network device obtains the correspondence between the NS indication information of the NS supported by the first access network device and the CAG identifier of the CAG supported by the first access network device, and sends the CAG identifier of the CAG supported by the core network device to the first access network device, so that the first access network device determines or modifies the CAG identifier of the CAG supported by the first access network device, to provide more service requirements in the NS for the terminal device.

With reference to the seventh aspect or the eighth aspect, in a possible implementation, the method further includes: The core network device sends a session resource setup request to the first access network device, where the session resource setup request includes a registered user of an NS corresponding to the session.

The core network device sends the registered user of the NS corresponding to the session to the first access network device, so that the first access network device determines whether a service of the NS corresponding to the session can be provided.

According to a ninth aspect, a communication apparatus is provided. The apparatus includes: a receiving unit, configured to receive a first message from a core network device, where the first message includes a correspondence between network slice NS indication information of an NS supported by a terminal device and a nonpublic network NPN identifier of an NPN supported by the terminal device, where the receiving unit is further configured to receive a second message from a first access network device, where the second message is used to indicate an NPN identifier of an NPN supported by the first access network device; and a processing unit, configured to determine an NS supported by the first access network device.

According to a tenth aspect, a communication apparatus is provided. The apparatus includes: a receiving unit, configured to receive a first message from a core network device, where the first message includes a correspondence between network slice NS indication information of an NS supported by a terminal device and a closed access group CAG identifier of a CAG supported by the terminal device, where the receiving unit is further configured to receive a second message from a first access network device, where the second message is used to indicate a CAG identifier of a CAG supported by the first access network device; and a processing unit, configured to determine an NS supported by the first access network device.

With reference to the ninth aspect or the tenth aspect, in a possible implementation, the receiving unit is further configured to receive a system message SIB from the first access network device, where the SIB includes identification information of a cell, and the cell is a neighboring cell of a cell on which the terminal device camps.

With reference to the ninth aspect or the tenth aspect, in a possible implementation, the SIB further includes the NPN identifier corresponding to the cell or the CAG identifier corresponding to the cell.

With reference to the ninth aspect or the tenth aspect, in a possible implementation, the SIB further includes capability information of a second access network device, the capability information is used to indicate capability information of whether the second access network device can be used as a secondary access network device, and the second access network device is an access network device in which the cell is located.

According to an eleventh aspect, a communication apparatus is provided. The apparatus includes a processor. The processor is coupled to a memory, and may be configured to execute instructions in the memory, to implement the method according to any one of the ninth aspect, the tenth aspect, or the possible implementations of the ninth aspect or the tenth aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

According to a twelfth aspect, a communication apparatus is provided. The apparatus includes: a receiving unit, configured to obtain a non-public network NPN identifier of an NPN supported by a first access network device; and a sending unit, configured to send a second message to a terminal device, where the second message is used to indicate the NPN identifier of the NPN supported by the first access network device.

According to a thirteenth aspect, a communication apparatus is provided. The apparatus includes: a receiving unit, configured to obtain a closed access group CAG identifier of a CAG supported by a first access network device; and a sending unit, configured to send a second message to a terminal device, where the second message is used to indicate the CAG identifier of the CAG supported by the first access network device.

With reference to the twelfth aspect or the thirteenth aspect, in a possible implementation, the sending unit is further configured to send a system message SIB to the terminal device, where the SIB includes identification information of a cell, and the cell is a neighboring cell of a cell on which the terminal device camps.

With reference to the twelfth aspect or the thirteenth aspect, in a possible implementation, the SIB further includes the NPN identifier corresponding to the cell or the CAG identifier corresponding to the cell.

With reference to the twelfth aspect or the thirteenth aspect, in a possible implementation, the SIB further includes capability information of a second access network device, the capability information is used to indicate capability information of whether the second access network device can be used as a secondary access network device, and the second access network device is an access network device in which the cell is located.

According to a fourteenth aspect, a communication apparatus is provided. The apparatus includes: a sending unit, configured to send an interface setup request to a core network device, where the interface setup request includes a correspondence between network slice NS indication information of an NS supported by a first access network device and a non-public network NPN identifier of an NPN supported by the first access network device; and a receiving unit, configured to receive an interface setup response sent by the core network device, where the interface setup response includes an NPN identifier of an NPN supported by the core network device.

According to a fifteenth aspect, a communication apparatus is provided. The apparatus includes: a sending unit, configured to send an interface setup request to a core network device, where the interface setup request includes a correspondence between network slice NS indication information of an NS supported by a first access network device and a closed access group CAG identifier of a CAG supported by the first access network device; and a receiving unit, configured to receive an interface setup response sent by the core network device, where the interface setup response includes a CAG identifier of a CAG supported by the core network device.

With reference to the fourteenth aspect or the fifteenth aspect, in a possible implementation, the receiving unit is further configured to receive a session resource setup request sent by the core network device, where the session resource setup request includes a registered user of an NS corresponding to the session.

With reference to the fourteenth aspect or the fifteenth aspect, in a possible implementation, the sending unit is further configured to send an additional request to a second access network device, where the additional request includes a registered user of an NS corresponding to the session.

According to a sixteenth aspect, a communication apparatus is provided. The apparatus includes a processor. The processor is coupled to a memory, and may be configured to execute instructions in the memory, to implement the method according to any one of the twelfth aspect to the fifteenth aspect or the possible implementations of the twelfth aspect to the fifteenth aspect. Optionally, the communication apparatus further includes the memory. Optionally, the communication apparatus further includes a communication interface, and the processor is coupled to the communication interface.

In an implementation, the communication apparatus is a first access network device. When the communication apparatus is the first access network device, the communication interface may be a transceiver or an input/output interface.

In another implementation, the communication apparatus is a chip disposed in an access network device. When the communication apparatus is the chip disposed in the access network device, the communication interface may be an input/output interface.

Optionally, the transceiver may be a transceiver circuit. Optionally, the input/output interface may be an input/output circuit.

According to a seventeenth aspect, a communication apparatus is provided. The apparatus includes: a receiving unit, configured to receive an interface setup request sent by a first access network device, where the interface setup request includes a correspondence between network slice NS indication information of an NS supported by the first access network device and a non-public network NPN identifier of an NPN supported by the first access network device; and a sending unit, configured to send an interface setup response to the first access network device, where the interface setup response includes an NPN identifier of an NPN supported by a core network device.

According to an eighteenth aspect, a communication apparatus is provided. The apparatus includes: a receiving unit, configured to receive an interface setup request sent by a first access network device, where the interface setup request includes a correspondence between network slice NS indication information of an NS supported by the first access network device and a closed access group CAG identifier of a CAG supported by the first access network device; and a sending unit, configured to send an interface setup response to the first access network device, where: the interface setup response includes a CAG identifier of a CAG supported by a core network device.

With reference to the seventeenth aspect or the eighteenth aspect, in a possible implementation, the sending unit is further configured to send a session resource setup request to the first access network device, where the session resource setup request includes a registered user of an NS corresponding to the session.

According to a nineteenth aspect, a communication apparatus is provided. The apparatus includes a processor. The processor is coupled to a memory, and may be configured to execute instructions in the memory, to implement the method according to any one of the seventeenth aspect, the eighteenth aspect, or the possible implementations of the seventeenth aspect or the eighteenth aspect. Optionally, the communication apparatus further includes the memory. Optionally, the communication apparatus further includes a communication interface, and the processor is coupled to the communication interface.

In an implementation, the communication apparatus is a core network device. When the communication apparatus is the core network device, the communication interface may be a transceiver or an input/output interface.

In another implementation, the communication apparatus is a chip disposed in a core network device. When the communication apparatus is the chip disposed in the core network device, the communication interface may be an input/output interface.

Optionally, the transceiver may be a transceiver circuit. Optionally, the input-'output interface may be an input/output circuit.

According to a twentieth aspect, a processor is provided. The processor includes an input circuit, an output circuit, and a processing circuit. The processing circuit is configured to: receive a signal through the input circuit, and transmit a signal through the output circuit, so that the processor is enabled to perform the method according to any one of the first aspect to the eighth aspect and the possible implementations of the first aspect to the eighth aspect.

In a specific implementation process, the processor may be a chip, the input circuit may be an input pin, the output circuit may be an output pin, and the processing circuit may be a transistor, a gate circuit, a trigger, various logic circuits, and the like. An inputted signal received by the input circuit may be received and inputted by, for example, but not limited to, a receiver, a signal outputted by the output circuit may be outputted to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in the embodiments of this application.

According to a twenty-first aspect, a processing apparatus is provided. The processing apparatus includes a processor and a memory. The processor is configured to: read instructions stored in the memory, receive a signal through a receiver, and transmit a signal through a transmitter, to perform the method according to any one of the first aspect to the eighth aspect and the possible implementations of the first aspect to the eighth aspect.

Optionally, there are one or more processors and one or more memories.

Optionally, the memory may be integrated into the processor, or the memory and the processor are separately disposed.

In a specific implementation process, the memory may be a non-transitory (non-transitory) memory, such as a read-only memory (read only memory, ROM). The memory and the processor may be integrated on a same chip, or may be separately disposed on different chips. A type of the memory and a manner in which the memory and the processor are disposed are not limited in the embodiments of this application.

It should be understood that a related data exchange process, for example, sending of indication information, may be a process of outputting the indication information from the processor, and receiving of capability information, may be a process of receiving the input capability information by the processor. Specifically, data outputted by the processor may be outputted to a transmitter, and inputted data received by the processor may be from a receiver. The transmitter and the receiver may be collectively referred to as a transceiver.

The processing apparatus in the twenty-first aspect may be a chip. The processor may be implemented by using hardware or software. When the processor is implemented by using the hardware, the processor may be a logic circuit, an integrated circuit, or the like. When the processor is implemented by using the software, the processor may be a general-purpose processor implemented by reading software code stored in a memory, where the memory may be integrated into the processor, or may be located outside the processor and exist independently.

According to a twenty-second aspect, a computer program product is provided. The computer program product includes a computer program (which may also be referred to as code or instructions). When the computer program is run, a computer is enabled to perform the method according to any one of the first aspect to the eighth aspect and the possible implementations of the first aspect to the eighth aspect.

According to a twenty-third aspect, a computer-readable medium is provided. The computer-readable medium stores a computer program (which may also be referred to as code or instructions). When the computer program is run on a computer, the computer is enabled to perform the method according to any one of the first aspect to the eighth aspect and the possible implementations of the first aspect to the eighth aspect.

According to a twenty-fourth aspect, a communication system is provided. The communication system includes the core network device, the access network device, and the terminal device.

DESCRIPTION OF EMBODIMENTS

The following describes technical solutions of this application with reference to the accompanying drawings.

The technical solutions of embodiments of this application may be appLTEd to various communication systems, such as a global system for mobile communications (global system for mobile communications, GSM) system, system, a code division multiple access (code division multiple access. CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS) system, a worldwide interoperability for microwave access (worldwide interoperability for microwave access, WiMAX) communication system, a future 5th generation (5th generation, 5G) system, or a new radio (new radio, NR) system.

Figure 1:
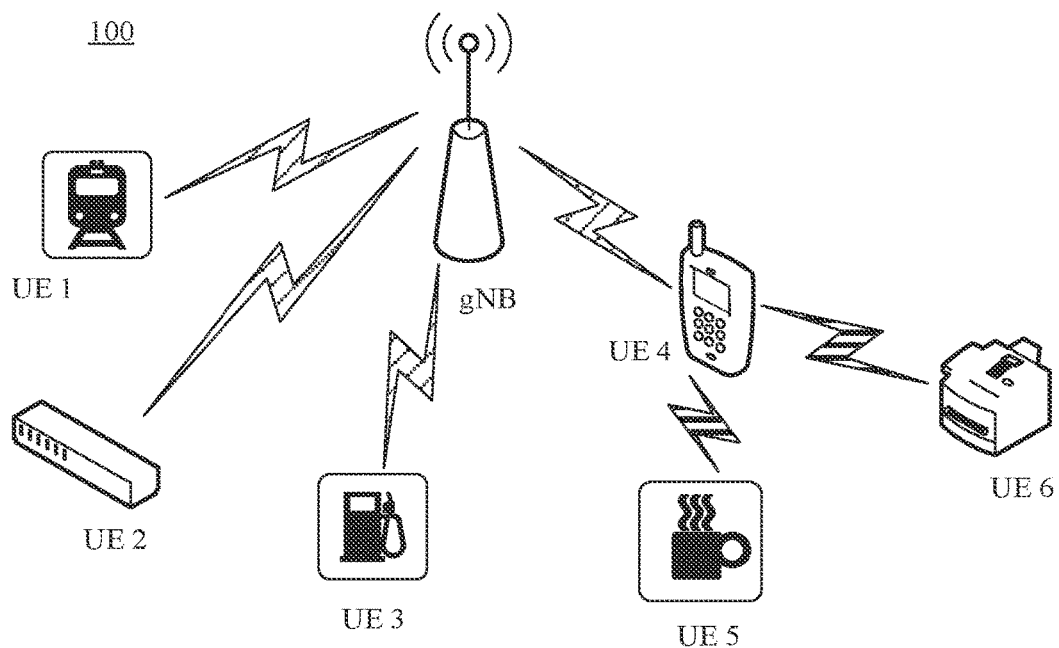
FIG. 1 is a schematic diagram of a communication system 100 according to a method according to an embodiment of this application.

For ease of understanding the embodiments of this application, a communication system to which a method according to an embodiment of this application is applicable is first described in detail with reference to FIG. 1. FIG. 1 is a schematic diagram of a communication system 100 to which a method according to an embodiment of this application is applicable. As shown in the figure, the communication system 100 may include at least one network device, for example, a gNB (gNB) in a 5G system shown in FIG. 1. The communication system 100 may further include at least one terminal device, for example, user equipment (user equipment, UE) 1 to UE 6 shown in FIG. 1. An access network device may communicate with each terminal device over a radio link. For example, the access network device may send configuration information to the terminal device, and the terminal device may send uplink data to the access network device based on the configuration information. For another example, the access network device may send downlink data to the terminal device.

Terminal devices in the communication system 100, for example, the UE 4 to the UE 6, may also constitute a communication system. For example, the UE 4 may control the UE 5 and the UE 6 to execute corresponding instructions. This is not limited in this application.

The terminal device in the embodiments of this application may also be referred to as user equipment, an access terminal, a subscriber unit, a subscriber station, a mobile station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

It should be understood that the access network device in the communication system may be any device that has a wireless transceiver function. The access network device includes but is not limited to an evolved NodeB (evolved Node B, eNB), a radio network controller (radio network controller, RNC), a NodeB (Node B, NB), a base station controller (base station controller, BSC), a base transceiver station (base transceiver station, BTS), a home base station (for example, a home evolved NodeB, or a home Node B, HNB), a baseband unit (baseband Unit, BBU), an access point (access point, AP) in a wireless fidelity (wireless fidelity, WiFi) system, a wireless relay node, a wireless backhaul node, a transmission point (transmission point, TP), a transmission reception point (transmission and reception point, TRP), or the like. Alternatively, the access network device may be a gNB or a transmission point (TRP or TP) in a 5G system such as an NR system, may be one antenna panel or a group (including a plurality of antenna panels) of antenna panels of a base station in a 5G system, or may be a network node, such as a baseband unit (BBU) or a distributed unit (distributed unit, DU), that constitutes a gNB or a transmission point.

In some deployments, the gNB may include a central unit (centralized unit, CU) and a DU. The gNB may further include a radio frequency unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer eventually becomes information at the PHY layer or is transformed from information at the PHY layer. Therefore, in this architecture, it may be considered that higher layer signaling such as RRC layer signaling is sent by the DU or is sent by the DU and the CU. It may be understood that the network device may be a CU node, a DU node, or a device including a CU node and a DU node. In addition, the CU may be classified as a network device in an access network (radio access network, RAN), or the CU may be classified as an access network device in a core network (core network, CN). This is not limited in this application.

In addition, in the embodiments of the present invention, the access network device serves a cell. The terminal device communicates with the access network device on a transmission resource (for example, a frequency domain resource, namely, a spectrum resource) used for the cell. The cell may be a cell corresponding to the access network device (for example, a base station), The cell may belong to a macro base station, or a base station corresponding to a small cell (small cell). The small cell herein may include a metro cell (metro cell), a micro cell (micro cell), a pico cell (pico cell), a femto cell (femto cell), or the like. These small cells feature small coverage and low transmit power, and are suitable for providing a high-rate data transmission service.

In addition, a plurality of cells may simultaneously work in a same frequency band on a carrier in the LTE system or the 5G system. In some special scenarios, it may be considered that a concept of the carrier is equivalent to that of the cell. For example, in a carrier aggregation (carrier aggregation, CA) scenario, both a carrier index of a secondary component carrier and a cell identifier (cell identification, Cell ID) of a secondary cell that works on the secondary component carrier are carried when the secondary component carrier is configured for UE. In this case, it may be considered that the concept of the carrier is equivalent to that of the cell. For example, that the UE accesses a carrier is equivalent to a description that the UE accesses a cell.

A core network device may be connected to a plurality of access network devices, and is configured to control the access network devices. In addition, the core network device can distribute, to the access network devices, data received from a network side (for example, the internet).

The foregoing listed functions and specific implementations of the terminal device, the access network device, and the core network device are merely examples for description. This is not limited in the present invention.

It should be further understood that FIG. 1 is merely a simplified schematic diagram used as an example for ease of understanding. The communication system 100 may further include another network device or another terminal device, which is not shown in FIG. 1.

For ease of understanding the embodiments of this application, several concepts used in the following are first briefly described.

1. A system message (system information block, SIB) is a message, an announcement, a notification, a prompt, or the like that is released by the access network device to the terminal device in an information broadcast form. The system message has characteristics of group sending and high reachability. Different SIBs may carry different parameters. For example, a SIB 1 mainly carries information related to cell access and cell selection, and a SIB 2 may carry a common radio resource configuration parameter or common information related to intra-frequency, inter-frequency, and inter-RAT cell reselection.

2. A tracking area (tracking area, TA) includes one or more cells. When the tracking area includes a plurality of cells, the plurality of cells may belong to one access network device, or may belong to a plurality of access network devices.

3. A registration area (registration area, RA) includes one or more TAs. When the terminal device is out of coverage of the RA, the terminal device triggers update of the registration area.

4. Master node: In a dual-connectivity scenario, the master node sets up a control plane interface with the core network device.

5. Secondary node: In a dual-connectivity scenario, the secondary node may provide a radio resource other than the master node for the terminal device.

6. A non-public network (non-public network, NPN) is a network deployed for a non-public purpose, for example, a network of a vertical vendor. The NPN may be deployed in two manners. The first manner is a standalone non-public network (stand-alone non-public network, SNPN), to be specific, the network does not depend on a function provided by a conventional carrier network (for example, a PLMN). The second manner is a non-standalone non-public network (non-stand-alone non-public network, NSNPN), and operation of the network requires support of the PLMN. In this specification, the NPN may be referred to as a private network.

7. A network slice (network slice, NS) includes a complete network function. One physical network may include one or more network slices, and different network slices may meet different service requirements, for example, a latency, bandwidth, security, and reliability. The network slice can flexibly cope with different network application scenarios.

8. Allowed network slice: When a registration area is updated or the terminal device initially accesses the network, the core network device allocates network slice identification information to the terminal device, where the network slice identification information is used to indicate a service that can be initiated by the terminal device in a current registration area. That is, a network slice to which a session that can be initiated by the terminal device belongs can only be in the allowed network slice.

Indication information of each network slice in any embodiment of this application may include at least one of a network slice identifier, single network slice selection assistance information (single network slice selection assistance information, S-NSSAI), and access network slice selection assistance information (RAN network slice selection assistance information, R-NSSAI).

The network slice identifier may be represented by using at least one of the following (1) to (7).

Network slice type information: For example, the network slice type information may indicate network slice types such as enhanced mobile broadband (enhanced mobile broadband, eMBB), ultra-reliable low-latency communication (ultra-reliable low latency communications, URLLC), and massive machine-type communications (massive Machine Type Communication, mMTC). Optionally, the network slice type information may alternatively indicate an end-to-end network slice type, including a RAN-to-core network (core network, CN) network slice type, a RAN-side network slice type, or a CN-side network slice type.

(2) Service type information: The service type information is related to a specific service. For example, the service type information may indicate a service feature such as a video service, an internet of vehicles service, or a voice service, or information about a specific service.

(3) Tenant (tenant) information: The tenant information is used to indicate information about a client creating or renting the network slice, for example, Tencent or the State Grid Corporation of China.

(4) User group information: The user group information is used to indicate grouping information for grouping users based on a specific feature such as a user level.

(5) Slice group information: The slice group information is used to indicate information about a slice group grouped based on a specific feature. For example, all network slices that can be accessed by the terminal device may be classified as one slice group, or network slices may be grouped based on another standard.

(6) Network slice instance information: The network slice instance information is used to indicate an identifier and feature information of an instance created for the network slice. For example, an identifier may be allocated to the network slice instance, to indicate the network slice instance, or a new identifier may be mapped based on a network slice instance identifier, to be associated with the network slice instance, and a receiving side may identify, based on the identifier, a specific network slice instance indicated by the identifier.

(7) Dedicated core network (dedicated core network, DCN) identifier: The identifier is used to uniquely indicate a dedicated core network in an LTE system or an enhanced LTE (enhanced LTE, eLTE) system, for example, a dedicated core network of the internee of things. Optionally, the DCN identifier may perform mapping with the network slice identifier, the network slice identifier may be obtained by mapping the DCN identifier, and the DCN identifier may also be obtained by mapping the network slice identifier.

The S-NSSAI includes at least slice/service type (slice/service type, SST) information, and optionally, may further include slice differentiator (slice differentiator, SD) information. The SST information, such as a feature and a service type of a network slice, is used to indicate behavior of the network slice. The SD information is supplementary information of the SST information. If the SST points to a plurality of network slice instances, the SD may correspond to one unique network slice instance.

The R-NSSAI indicates a group of specific pieces of S-NSSAI, namely, an identifier of a set of specific pieces of S-NSSAI.

It should be understood that, in the embodiments of this application, the network slice may use at least one of the foregoing parameters to represent network slice indication information. For example, the network slice indication information may be represented by using the network slice type, or may be represented by using the network slice type and the service type, or may be represented by using the service type and the tenant information. This is not limited in the embodiments of this application. Details about how to represent the network slice indication information of the network slice are not described again below. Optionally, a specific coding form of the network slice indication information is not limited. Different fields, of an interface message that can be carried between different devices, may separately represent different network slice indication information. Alternatively, abstracted index values can be used for replacement, and different index values separately correspond to different network slices. Certainly, in addition to the foregoing identifiers, another identifier may be further used. This is not limited herein. It should be understood that if the terminal device, the access network device, or the core network device supports a plurality of network slices, the network slice indication information of the network slice supported by the terminal device, the access network device, or the core network device may be represented in a form of listing at least one of the foregoing identifiers.

9. Closed access group (closed access group, CAG): If an access network device or a cell belongs to the CAG, only a registered user of the CAG can access the access network device or the cell. That is, only the user of the CAG can be served by the access network device or the cell.

In the conventional technology, for an NPN network of an NS, a network slice manner may be used to implement the NPN network, that is, each NPN network corresponds to one or more NSs, and each network slice may also correspond to a plurality of NPN networks. However, the NS manner cannot meet a requirement of the CAG, that is, a user not belonging to the NPN cannot be forbidden to access the NS corresponding to the NPN network.

Therefore, a method for forbidding the user not belonging to the NPN to access the NPN network or the NS corresponding to the NPN network urgently needs to be provided.

For ease of understanding embodiments of this application, the following several descriptions are provided before the embodiments of this application are described.

First, in the embodiments of this application, the "CAG" merely indicates that an access network device or a cell is a closed access cell, and the "CAG" may also be a "CSG". A name of the closed access group is not limited in this application.

Second, in the embodiments of this application, the "NPN" merely indicates a private network, and a name of the private network is not limited in this application.

Third, in the embodiments of this application, granularities of the CAG and the NPN may be cell granularities, may be tracking area (tracking area, TA) granularities, or may be public land mobile network (public land mobile network, PLMN) granularities.

Fourth, in the embodiments of this application, the correspondence between the non-public network and the closed access group may be specific to the current registration area, or the correspondence between the non-public network and the closed access group may be specific to each PLMN in the current registration area.

Fifth, in the embodiments of this application, the term "indication" may include a direct indication and an indirect indication, or may include an explicit indication and an implicit indication. Information indicated by a piece of information (for example, first indication information described below) is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, specific information may also be indicated by using a pre-agreed (for example, stipulated in a protocol) arrangement sequence of various pieces of information, to reduce indication overheads to some extent.

Sixth, the terms "first", "second", and various numbers in the following embodiments are merely used for differentiation for ease of description, and are not used to limit the scope of the embodiments of this application. For example, the terms are used to distinguish between different indication information or messages.

Seventh, a "protocol" in the embodiments of this application may be a standard protocol in the communication field, for example, may include an LTE protocol, an NR protocol, and a related protocol applied to a future communication system. This is not limited in this application.

Eighth, "a plurality of" in the embodiments of this application means two or more. One or more of the following items (pieces)" or a similar expression thereof refers to any combination of these items, including any combination of singular items (pieces) or plural items (pieces). For example, at least one (piece) or a plurality (pieces) of a, b, or c may indicate: a, b, c, a and b, a and c, b and c, or a, b, and c, where a, b, and c may be singular or plural.

Ninth, "predefine" in the embodiments of this application may be understood as "define", "predefine", "store", "pre-store", "pre-negotiate", "pre-configure", "solidify", or "pre-burn".

The method provided in the embodiments of this application is described in detail below with reference to the accompanying drawings.

It should be understood that the method provided in this application is applicable to a wireless communication system, for example, the wireless communication system 100 shown in FIG. 1. There is a wireless communication connection between two communication apparatuses in the wireless communication system. One communication apparatus may correspond to any one of the UE 1 to the UE 6 shown in FIG. 1, for example, may be any one of the UE 1 to the UE 6 in FIG. 1, or may be a chip disposed in any one of the UE 1 to the UE 6. The other communication apparatus may correspond to the gNB shown in FIG. 1, for example, may be the gNB in FIG. 1, or may be a chip disposed in the gNB.

Without loss of generality, interaction between the terminal device and the network device is used as an example below to describe in detail the embodiments of this application. It may be understood that any terminal device in the wireless communication system may communicate, by using a same method, with one or more network devices having a wireless communication connection. This is not limited in this application.

Figure 2:
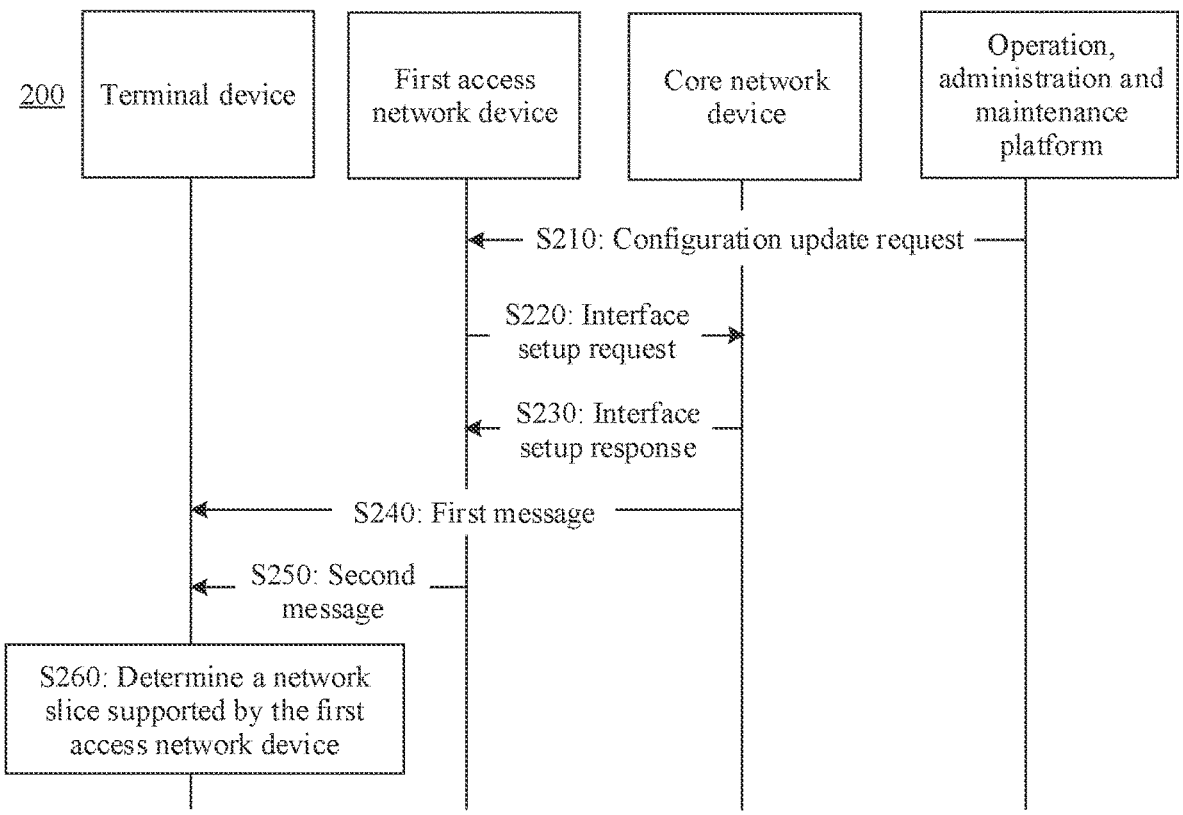
FIG. 2 is a schematic flowchart of a communication method according to an embodiment of this application.

FIG. 2 is a schematic flowchart of a communication method 200 from a device interaction perspective according to an embodiment of this application. As shown in the figure, the method may include step S210 to step S260. The steps in the method 200 are described in detail below.

Step S210: A first access network device receives a configuration update request sent by an operation, administration and maintenance (operation, administration and maintenance, OAM) platform. The configuration update request includes at least one of the following: an NPN identifier of an NPN supported by the first access network device, a CAG identifier of a CAG supported by the first access network device, NS indication information of an NS supported by the first access network device, a correspondence between the NPN identifier of the NPN supported by the first access network device and the NS indication information of the NS supported by the first access network device, or a correspondence between the CAG identifier of the CAG supported by the first access network device and the NS indication information of the NS supported by the first access network device. The NS indication information of the NS supported by the first access network device is used to indicate the NS supported by the first access network device. Optionally, the configuration update request may alternatively be a configuration request or a configuration command request. This is not limited in this application.

The first access network device may update, based on the configuration update request, a local CAG, a local NPN, a local NS, a local correspondence between the CAG and the NPN, or a local correspondence between the CAG and the NS of the first access network device. For example, the configuration update request may alternatively include an NPN identifier of an NPN supported by other access network devices including the first access network device. In other words, the configuration update request includes an NPN identifier of an NPN supported by a plurality of access network devices. The configuration update request may alternatively include a CAG identifier of a CAG supported by other access network devices including the first access network device. In other words, the configuration update request includes a CAG identifier of a CAG supported by a plurality of access network devices. The configuration update request may alternatively include NS indication information of an NS supported by other access network devices including the first access network device. In other words, the configuration update request includes NS indication information of an NS supported by a plurality of access network devices, where the NS indication information of the NS supported by the access network device is used to indicate the NS supported by the access network device.

Optionally, the correspondence between the NPN identifier of the NPN supported by the first access network device and the NS indication information of the NS supported by the first access network device may be a correspondence between the NPN indicated by the NPN identifier of the NPN supported by the first access network device and the NS indicated by the NS indication information of the NS supported by the first access network device. Alternatively, the correspondence may indicate the NS that can be supported by the NPN indicated by the NPN identifier of the NPN supported by the first access network device and that is indicated by the NS indication information of the NS supported by the first access network device. Alternatively, the correspondence may indicate the NS that is included in the NPN indicated by the NPN identifier of the NPN supported by the first access network device and that is indicated by the NS indication information of the NS supported by the first access network device.

Optionally, the correspondence between the CAG identifier of the CAG supported by the first access network device and the NS indication information of the NS supported by the first access network device may be a correspondence between the CAG indicated by the CAG identifier of the CAG supported by the first access network device and the NS indicated by the NS indication information of the NS supported by the first access network device. Alternatively, the correspondence may indicate the NS that can be supported by the CAG indicated by the CAG identifier of the CAG supported by the first access network device and that is indicated by the NS indication information of the NS supported by the first access network device. Alternatively, the correspondence may indicate the NS that is included in the CAG indicated by the CAG identifier of the CAG supported by the first access network device and that is indicated by the NS indication information of the NS supported by the first access network device.

It may be understood that for an NSNPN, if a private network is supported in an NS manner, in other words, the private network may be represented as one or more network slices, the configuration update request may include the CAG identifier of the CAG supported by the first access network device, may include the NS indication information of the NS supported by the first access network device, or may include the correspondence between the CAG identifier of the CAG supported by the first access network device and the NS indication information of the NS supported by the first access network device.

It may be understood that for an SNPN, the configuration update request may include the NPN identifier of the NPN supported by the first access network device, may include the NS indication information of the NS supported by the first access network device, or may include the correspondence between the NPN identifier of the NPN supported by the first access network device and the NS indication information of the NS supported by the first access network device.

Step S220: The first access network device sends an interface setup request to a core network device. The interface setup request includes the correspondence between the NS indication information of the NS supported by the first access network device and the NPN identifier of the NPN supported by the first access network device or the correspondence between the NS indication information of the NS supported by the first access network device and the CAG identifier of the CAG supported by the first access network device. It may be understood that the interface setup request may alternatively be a first access network device update message.

Optionally, the interface setup request may alternatively include at least one of the following: the NS indication information of the NS supported by the first access network device, the NPN identifier of the NPN supported by the first access network device, or the CAG identifier of the CAG supported by the first access network device.

It may be understood that the NPN identifier of the NPN supported by the first access network device may be a PLMN granularity. To be specific, in the interface setup request, one or more PLMNs each include the NPN identifier that corresponds to the PLMN and that is of the NPN supported by the first access network device. For example, an optional expression form of the NPN identifier of the NPN supported by the first access network device is as follows:

>Public Land Mobile Network Identifier (Public Land Mobile Network Identity, PLMN ID)
>Non-Public Network Identifier (Non-Public Network Identity, NPN ID)

There may be one or more NPN IDs. This is not limited in this application.

It may be understood that the NPN identifier of the NPN supported by the first access network device may alternatively be a tracking area (tracking area, TA) granularity. To be specific, in the interface setup request, one or more TAIs each include the NPN identifier that corresponds to the TAT and that is of the NPN supported by the first access network device. For example, an optional expression form of the NPN identifier of the NPN supported by the first access network device is as follows:

>Public Land Mobile Network Identifier (Public Land Mobile Network Identity, PLMN ID)
>Tracking Area Code (Tracking Area Code, TAC)
>Non-Public Network Identifier (Non-Public Network Identity, NPN ID)

There may be one or more NPN IDs. This is not limited in this application.

It may be understood that the CAG identifier of the CAG supported by the first access network device may alternatively be a TAC granularity, a cell granularity, or a base station granularity.

It may be understood that the CAG identifier of the CAG supported by the first access network device may be a PLMN granularity. To be specific, in the interface setup request, one or more PLMNs each include the CAG identifier that corresponds to the PLMN and that is of the CAG supported by the first access network device. For example, an optional expression form of the CAG identifier of the CAG supported by the first access network device is as follows:

>Public Land Mobile Network Identifier (Public Land Mobile Network Identity, PLMN ID)

>Closed Access Group Identifier (Closed Access Group Identity, CAG ID)

There may be one or more CAG IDs. This is not limited in this application.

It may be understood that the CAG identifier of the CAG supported by the first access network device may alternatively be a TAI granularity. To be specific, in the interface setup request, one or more TAIs each include the CAG identifier that corresponds to the TAI and that is of the CAG supported by the first access network device. For example, an optional expression form of the CAG identifier of the CAG supported by the first access network device is as follows:

>Public Land Mobile Network Identifier (Public Land Mobile Network Identity, MAIN ID)

>Tracking Area Code (Tracking Area Code, CAG ID)

>Closed Access Group Identifier (Closed Access Group Identity, CAG ID)

There may be one or more CAG IDs. This is not limited in this application.

It may be understood that the CAG identifier of the CAG supported by the first access network device may alternatively be a TAC granularity, a cell granularity, or a base station granularity.

Optionally, in different scenarios, content included in the interface setup request may be different. The following uses two scenarios as examples to describe content included in the interface setup request in the two scenarios.

In one scenario, for example, in an SNPN scenario, the interface setup request may include at least one of the following: the NPN identifier of the NPN supported by the first access network device or the NS indication information of the NS supported by the first access network device.

Optionally, the interface setup request may alternatively include the correspondence between the NPN identifier of the NPN supported by the first access network device and the NS indication information of the NS supported by the first access network device: The correspondence may be a correspondence between the NPN indicated by the NPN identifier of the NPN supported by the first access network device and the NS indicated by the NS indication information of the NS supported by the first access network device. Alternatively, the correspondence may indicate the NS that can be supported by the NPN indicated by the NPN identifier of the NPN supported by the first access network device and that is indicated by the NS indication information of the NS supported by the first access network device. Alternatively, the correspondence may indicate the NS that is included in the NPN indicated by the NPN identifier of the NPN supported by the first access network device and that is indicated by the NS indication information of the NS supported by the first access network device.

It may be understood that the correspondence between the NPN identifier and the NS indication information may be a correspondence between a group of NPN identifiers and the NS indication information, or the correspondence between the NPN identifier and the NS indication information may be a correspondence between a plurality of groups of NTN identifiers and the NS indication information. This is not limited in this application.

In the other scenario, for example, in an NSNPN scenario, the interface setup request may include at least one of the following: the CAG identifier of the CAG supported by the first access network device or the NS indication information of the NS supported by the first access network device.

Optionally, the interface setup request may alternatively include the correspondence between the CAG identifier of the CAG supported by the first access network device and the NS indication information of the NS supported by the first access network device. The correspondence may be a correspondence between the CAG indicated by the CAG identifier of the CAG supported by the first access network device and the NS indicated by the NS indication information of the NS supported by the first access network device. Alternatively, the correspondence may indicate the NS that can be supported by the CAG indicated by the CAG identifier of the CAG supported by the first access network device and that is indicated by the NS indication information of the NS supported by the first access network device. Alternatively, the correspondence may indicate the NS that is included in the CAG indicated by the CAG identifier of the CAG supported by the first access network device and that is indicated by the NS indication information of the NS supported by the first access network device.

It may be understood that the correspondence between the CAG identifier and the NS indication information may be a correspondence between a group of CAG identifiers and the NS indication information, or the correspondence between the CAG identifier and the NS indication information may be a correspondence between a plurality of groups of CAG identifiers and the NS indication information. This is not limited in this application.

Step S230: The first access network device receives an interface setup response sent by the core network device. The interface setup response includes a CAG identifier of a CAG supported by the core network device, or the interface setup response includes an NPN identifier of an NPN supported by the core network device. It may be understood that if in step S210, the interface setup request is the first access network device update message, in this step, the interface setup response may be a first access network device update acknowledgment message. It may be further understood that in this step, the interface setup response may alternatively be a core network device update message. If in this step, the interface setup response is the core network device update message, step S230 may be performed independently of S210 and S220.

Optionally, the interface setup request may alternatively include at least one of the following: NS indication information of an NS supported by the core network device, a correspondence between the NS indication information of the NS supported by the core network device and the CAG identifier of the CAG supported by the core network device, or a correspondence between the NS indication information of the NS supported by the core network device and the NPN identifier of the NPN supported by the core network device, where the NS indication information of the NS supported by the core network device is used to indicate the NS indicated by the core network device.

It may be understood that the NPN identifier of the NPN supported by the core network device may be a PLMN granularity. To be specific, in the interface setup response, one or more PLMNs each include the NPN identifier that corresponds to the PLMN and that is of the NPN supported by the core network device. For example, an optional expression form of the NPN identifier of the NPN supported by the core network device is as follows:

>Public Land Mobile Network Identifier (Public Land Mobile Network Identity, PLMN ID)

>Non-Public Network Identifier (Non-Public Network Identity, NPN ID)

There may be one or more NPN IDs. This is not limited in this application.

It may be understood that the NPN identifier of the NPN supported by the core network device may alternatively be a TAI granularity. To be specific, in the interface setup response, one or more IAIs each include the NPN identifier that corresponds to the TAT and that is of the NPN supported by the core network device. For example, an optional expression form of the NPN identifier of the NPN supported by the core network device is as follows:

>Public Land Mobile Network Identifier (Public Land Mobile Network Identity, PLMN ID)
>Tracking Area Code (Tracking Area Code, TAC)
>Non-Public Network Identifier (Non-Public Network Identity, NPN There may be one or more NPN IDs. This is not limited in this application.

It may be understood that the NPN identifier of the NPN supported by the core network device may be a TAC granularity, a cell granularity, or a base station granularity.

It may be understood that the CAG identifier of the CAG supported by the core network device may be a PLMN granularity. To be specific, in the interface setup response, one or more PLMNs each include the CAG identifier that corresponds to the PLMN and that is of the CAG supported by the core network device. For example, an optional expression form of the CAG identifier of the CAG supported by the core network device is as follows:

>Public Land Mobile Network Identifier (Public Land Mobile Network Identity, PLMN ID)
>Closed Access Group Identifier (Closed Access Group Identity, CAG ID)

There may be one or more CAG IDs. This is not limited in this application.

It may be understood that the CAG identifier of the CAG supported by the core network device may be a TAI granularity. To be specific, in the interface setup response, one or more TAIs each include the CAG identifier that corresponds to the TAT and that is of the CAG supported by the core network device. For example, an optional expression form of the CAG identifier of the CAG supported by the core network device is as follows:

>Public Land Mobile Network Identifier (Public Land Mobile Network Identity, PLMN ID)
>Tracking Area Code (Tracking Area Code, TAC)
>Closed Access Group Identifier (Closed Access Group Identity, CAG ID)

There may be one or more CAG IDs. This is not limited in this application.

It may be understood that the CAG identifier of the CAG supported by the core network device may alternatively be a TAC granularity, a cell granularity, or a base station granularity.

Optionally, in different scenarios, content included in the interface setup response may be different. The following uses two scenarios as examples to describe content included in the interface setup response in the two scenarios.

In one scenario, for example, in an SNPN scenario, the interface setup response may include at least one of the following: the NPN identifier of the NPN supported by the core network device or the NS indication information of the NS supported by the core network device.

Optionally, the interface setup response may alternatively include the correspondence between the NPN identifier of the NPN supported by the core network device and the NS indication information of the NS supported by the core network device. The correspondence may be a correspondence between the NPN indicated by the NPN identifier of the NPN supported by the core network device and the NS indicated by the NS indication information of the NS supported by the core network device. Alternatively, the correspondence may indicate the NS that can be supported by the NPN indicated by the NPN identifier of the NPN supported by the core network device and that is indicated by the NS indication information of the NS supported by the core network device. Alternatively, the correspondence may indicate the NS that is included in the NPN indicated by the NPN identifier of the NPN supported by the core network device and that is indicated by the NS indication information of the NS supported by the core network device.

It may be understood that the correspondence between the NPN identifier and the NS indication information may be a correspondence between a group of NPN identifiers and the NS indication information, or the correspondence between the NPN identifier and the NS indication information may be a correspondence between a plurality of groups of NPN identifiers and the NS indication information. This is not limited in this application.

In the other scenario, for example, in an NSNPN scenario, the interface setup response may include at least one of the following: the CAG identifier of the CAG supported by the core network device or the NS indication information of the NS supported by the core network device.

Optionally, the interface setup response may alternatively include the correspondence between the CAG identifier of the CAG supported by the core network device and the NS indication information of the NS supported by the core network device. The correspondence may be a correspondence between the CAG indicated by the CAG identifier of the CAG supported by the core network device and the NS indicated by the NS indication information of the NS supported by the core network device. Alternatively, the correspondence may indicate the NS that can be supported by the CAG indicated by the CAG identifier of the CAG supported by the core network device and that is indicated by the NS indication information of the NS supported by the core network device. Alternatively, the correspondence may indicate the NS that is included in the CAG indicated by the CAG identifier of the CAG supported by the core network device and that is indicated by the NS indication information of the NS supported by the core network device.

It may be understood that the correspondence between the CAG identifier and the NS indication information may be a correspondence between a group of CAG identifiers and the NS indication information, or the correspondence between the CAG identifier and the NS indication information may be a correspondence between a plurality of groups of CAG identifiers and the NS indication information. This is not limited in this application.

It may be understood that the first access network device may determine or modify, based on the interface setup response, the correspondence between the CAG identifier of the CAG supported by the first access network device and the NS indication information of the NS supported by the first access network device, or the correspondence between the NPN identifier of the NPN supported by the first access network device and the NS indication information of the NS supported by the first access network device.

For example, the first access network device may determine, based on the interface setup response, the correspondence between the CAG identifier of the CAG supported by the first access network device and the NS indication information of the NS supported by the first access network device. Alternatively, the first access network device may determine, based on the interface setup response, the correspondence between the NPN identifier of the NPN supported by the first access network device and the NS indication information of the NS supported by the first access network device. For example, the configuration update request does not include the correspondence between the CAG identifier of the CAG supported by the first access network device and the NS indication information of the NS supported by the first access network device. Alternatively, the configuration update request does not include the correspondence between the NPN identifier of the NPN supported by the first access network device and the NS indication information of the NS supported by the first access network device. In this case, after receiving the interface setup response, the first access network device stores the correspondence that is carried in the interface setup response and that is between the CAG identifier of the CAG supported by the core network device and the NS indication information of the NS supported by the core network device, or the correspondence that is carried in the interface setup response and that is between the NPN identifier of the NPN supported by the core network device and the NS indication information of the NS supported by the core network device. In addition, the first access network device determines, by using the correspondence between the CAG identifier of the CAG supported by the core network device and the NS indication information of the NS supported by the core network device, the correspondence between the CAG identifier of the CAG supported by the first access network device and the NS indication information of the NS supported by the first access network device. Alternatively, the first access network device determines, by using the correspondence between the NPN identifier of the NPN supported by the core network device and the NS indication information of the NS supported by the core network device, the correspondence between the NPN identifier of the NPN supported by the first access network device and the NS indication information of the NS supported by the first access network device. For example, CAGs supported by the first access network device may be a CAG 1 and a CAG 2, NSs supported by the first access network device may be an NS 1, an NS 2, an NS 3, an NS 4, and the configuration update request does not include a correspondence between the CAGs and the NSs. CAGs supported by the core network device may be a CAG 1, a CAG 2, and a CAG 3, and NSs supported by the core network device may be an NS 1, an NS 2, an NS 3, an NS 4, an NS 5, an NS 6, and an NS 7, and a correspondence between CAG identifiers of the CAGs supported by the core network device and NS indication information of the NSs supported by the core network device is as follows: The CAG 1 corresponds to the NS 1 and the NS 2; the CAG 2 corresponds to the NS 3, the NS 4, the NS 5, and NS 6; the CAG 3 corresponds to the NS 7. In this case, the first access network device determines, based on the correspondence between the CAG identifiers of the CAGs supported by the core network device and the NS indication information of the NSs supported by the core network device, the correspondence between the CAG identifier of the CAG supported by the first access network device and the NS indication information of the NS supported by the first access network device as: The CAG 1 corresponds to the NS 1 and the NS 2; the CAG 2 corresponds to the NS 3 and the NS 4.

For example, the first access network device may modify, based on the interface setup response, the correspondence between the CAG identifier of the CAG supported by the first access network device and the NS indication information of the NS supported by the first access network device. Alternatively, the first access network device may modify, based on the interface setup response, the correspondence between the NPN identifier of the NPN supported by the first access network device and the NS indication information of the NS supported by the first access network device. The configuration update request includes the correspondence between the CAG identifier of the CAG supported by the first access network device and the NS indication information of the NS supported by the first access network device. Alternatively, the configuration update request includes the correspondence between the NPN identifier of the NPN supported by the first access network device and the NS indication information of the NS supported by the first access network device. In this case, after receiving the interface setup response, the first access network device stores the correspondence that is carried in the interface setup response and that is between the CAG identifier of the CAG supported by the core network device and the NS indication information of the NS supported by the core network device, or the correspondence that is carried in the interface setup response and that is between the NPN identifier of the NPN supported by the core network device and the NS indication information of the NS supported by the core network device. In addition, the first access network device modifies, by using the correspondence between the CAG identifier of the CAG supported by the core network device and the NS indication information of the NS supported by the core network device, the correspondence between the CAG identifier of the CAG supported by the first access network device and the NS indication information of the NS supported by the first access network device. Alternatively, the first access network device modifies, by using the correspondence between the NPN identifier of the NPN supported by the core network device and the NS indication information of the NS supported by the core network device, the correspondence between the NPN identifier of the NPN supported by the first access network device and the NS indication information of the NS supported by the first access network device. For example, CAGs supported by the first access network device may be a CAG 1 and a CAG 2, NSs supported by the first access network device may be an NS 1, an NS 2, an NS 3, an NS 4, an NS 5, and an NS 6, and a correspondence between CAG identifiers of the CAGs supported by the first access network device and NS indication information of the NSs supported by the first access network device is determined as: The CAG 1 corresponds to the NS 1, the NS 2, and the NS 3; the CAG 2 corresponds to the NS 4, the NS 5, and the NS 6. CAGs supported by the core network device may be a CAG 1, a CAG 2, and a CAG 3, NSs supported by the core network device may be an NS 1, an NS 2, an NS 3, an NS 4, an NS 5, an NS 6, and an NS 7, and a correspondence between CAG identifiers of the CAGs supported by the core network device and NS indication information of the NSs supported by the core network device is as follows: The CAG 1 corresponds to the NS 1 and the NS 2; the CAG 2 corresponds to the NS 3, the NS 4, the NS 5, and the NS 6; the CAG 3 corresponds to the NS 7. In this case, the first access network device determines, based on the correspondence between the CAG identifier of the CAG supported by the core network device and the NS indication information of the NS supported by the core network device, the correspondence between the CAG identifier of the CAG supported by the first access network device and the NS indication information of the NS supported by the first access network device as: The CAG 1 corresponds to the NS 1, the NS 2, and the NS 3; the CAG 2 corresponds to the NS the NS 5, and the NS 6.

It may be understood that the first access network device may alternatively determine or modify, based on the interface setup response, the CAG identifier of the CAG supported by the first access network device, the NS indication information of the NS supported by the first access network device, or the correspondence between the CAG identifier of the CAG supported by the first access network device and the NS indication information of the NS supported by the first access network device. Alternatively, the first access network device may determine or modify, based on the interface setup response, the NPN identifier of the NPN supported by the first access network device, the NS indication information of the NS supported by the first access network device, or the correspondence between the NPN identifier of the NPN supported by the first access network device and the NS indication information of the NS supported by the first access network device. It may be understood that, if a CAG identifier of the CAG supported by the first access network device, an NPN identifier of the NPN supported by the first access network device, or NS indication information of the NS supported by the first access network device after modification is reduced (where the reduced CAG identifier of the CAG supported by the first access network device may be a first CAG identifier of a first CAG, the reduced NPN identifier of the NPN supported by the first access network device may be a first NPN identifier of a first NPN, or the reduced NS indication information of the NS supported by the first access network device may be first NS indication information of first NS) compared with the CAG identifier of to CAG supported by the first access network device, the NPN identifier of the NPN supported by the first access network device, or the NS indication information of the NS supported by the first access network device before the modification, this does not mean that the first access network device does not support the first CAG identifier, the first NPN identifier, or the first NS indication information permanently, or has no capability of supporting the first CAG identifier, the first NPN identifier, or the first NS indication information. However, because the core network device does not support the first CAG identifier, the first NPN identifier, or the first NS indication information currently, and the CAG, the NPN, and the NS are end-to-end concepts, the first access network device does not need to support a related capability. If the core network device can support the first CAG identifier, the first NPN identifier, or the first NS indication information ire the future, the first access network device can support the first CAG identifier, the first NPN identifier, or the first NS indication information.

For example, the first access network device may determine or modify, based on the interface setup response, the correspondence between the CAG identifier of the CAG supported by the first access network device and the NS indication information of the NS supported by the first access network device. If CAGs supported by the first access network device may be a CAG 1 and a CAG 2, and NSs supported by the first access network device may be an NS 1, an NS 2, an NS 3, an NS 4, an NS 5, and an NS 6, a correspondence that is included in the configuration update request and that is between CAG identifiers of the CAGs supported by the first access network device and NS indication information of the NSs supported by the first access network device is as follows: The CAG 1 corresponds to the NS 1, the NS 2, and the NS 3; the CAG 2 corresponds to the NS 4, the NS 5, and the NS 6. CAGs supported by the core network device may be a CAG 1 and a CAG 3, NSs supported by the core network device may be an NS 1, an NS 2, and an NS 7, and a correspondence between CAG identifiers of the CAGs supported by the core network device and NS indication information of the NSs supported by the core network device is as follows: The CAG 1 corresponds to the NS 1 and the NS 2; the CAG 3 corresponds to the NS 7. In this case, based on the CAG identifier of the CAG supported by the core network device, the NS indication information of the NS supported by the core network device, and the correspondence between the CAG identifier of the CAG supported by the core network device and the NS indication information of the NS supported by the core network device, the first access network device may modify the CAG identifier of the CAG supported by the first access network device to the CAG 1, the NS indication information of the NS supported by the first access network device to the NS 1 and the NS 2, and the correspondence between the CAG identifier of the CAG supported by the first access network device and the NS indication information of the NS supported by the first access network device to be: The CAG 1 corresponds to the NS 1 and the NS 2. It may be understood that, after the first access network device may modify, based on the interface setup response, the correspondence between the CAG identifier of the CAG supported by the first access network device and the NS indication information of the NS supported by the first access network device, if the first access network device broadcasts the CAG supported by the first access network device, the CAG identifier, of the CAG supported and broadcast by the first access network device, in a broadcast message includes only the CAG 1 and does not include the CAG 2.

In the communication method 200 provided in this embodiment of this application, after performing step S210 and step S230, the core network device may immediately perform step S240, or may perform step S240 within first time, where the first time may be 0 seconds or 60 seconds. The first time is not limited in this application.

Step S240: A terminal device receives a first message from the core network device. The first message may include a correspondence between NS indication information of an NS supported by the terminal device and an NPN identifier of an NPN supported by the terminal device, or the first message may include a correspondence between NS indication information of an NS supported by the terminal device and a CAG identifier of a CAG supported by the terminal device. Optionally, the first message may alternatively include at least one of the following: the NS indication information of the NS supported by the terminal device, the NPN identifier of the NPN supported by the terminal device, or the CAG identifier of the CAG supported by the terminal device. Optionally, the first message may alternatively include at least one of the following: the NS indication information of the NS supported by the first access network device, the NPN identifier of the NPN supported by the first access network device, the CAG identifier of the CAG supported by the first access network device, or the correspondence between the network slice NS indication information of the NS supported by the first access network device and the NPN identifier of the NPN supported by the first access network device. Alternatively, the first message may include the correspondence between the network slice NS indication information of the NS supported by the first access network device and the CAG identifier of the CAG supported by the first access network device. Optionally, the first message may alternatively include at least one of the following: the network slice NS indication information of the NS supported by the core network device, the NPN identifier of the NPN supported by the core network device, the CAG identifier of the CAG supported by the core network device, or the correspondence between the network slice NS indication information of the NS supported by the core network device and the NPN identifier of the NPN supported by the core network device. Alternatively, the first message may include the correspondence between network slice NS indication information of the NS supported by the core network device and the CAG identifier of the CAG supported by the core network device.

Optionally, the NPN identifier of the NPN supported by the terminal device may be used to indicate the NPN supported by the terminal device, and the NPN supported by the terminal device may be an NPN that can be supported by the terminal in a current serving cell. In other words, an NPN supported by the terminal device in another cell may be different from the NPN indicated by the NPN identifier of the NPN supported by the terminal device. Alternatively, the NPN supported by the terminal device may be an NPN that can be supported by the terminal in a registration area to which the terminal currently belongs. In other words, all cells in the registration area to which the terminal currently belongs may support the NPN indicated by the NPN identifier of the NPN supported by the terminal device. After the terminal device moves out of the current registration area, the NPN that can be supported by the terminal device may be different from the NPN indicated by the NPN identifier of the NPN supported by the terminal device, or may be an NPN that can be supported by the terminal device in a tracking area to which the terminal device currently belongs. In other words, all cells in the tracking area to which the terminal currently belongs may support the NPN indicated by the NPN identifier of the NPN supported by the terminal device. After the terminal device moves out of the current tracking area, the NPN that can be supported by the terminal may be different from the NPN indicated by the NPN identifier of the NPN supported by the terminal device.

Optionally, the NS indication information of the NS supported by the terminal device may alternatively be used to indicate the NS supported by the terminal device. The NS supported by the terminal device may be an NS that can be supported by the terminal in a current serving cell. In other words, an NS supported by the terminal device in another cell may be different from the NS indicated by the NS indication information of the NS supported by the terminal device. Alternatively, the NS supported by the terminal device may be an NS that can be supported by the terminal in a registration area to which the terminal currently belongs. In other words, all cells in the registration area to which the terminal currently belongs may support the NS of the NS indication information of the NS supported by the terminal device. After the terminal moves out of the current registration area, the NS that can be supported by the terminal may be different from the NS indicated by the NS indication information of the NS supported by the terminal device, or may be an NS that can be supported by the terminal in a tracking area to which the terminal currently belongs. In other words, all cells in the tracking area to which the terminal currently belongs may support the NS indicated by the NS indication information of the NS supported by the terminal device. After the terminal moves out of the current tracking area, the NS that can be supported by the terminal may be different from the NS indicated by the NS indication information of the NS supported by the terminal device.

Optionally, the CAG identifier of the CAG supported by the terminal device may be used to indicate the CAG supported by the terminal device. The CAG supported by the terminal device may be a CAG that can be supported by the terminal in a current serving cell. In other words, a CAG supported by the terminal device in another cell may be different from the CAG indicated by the CAG identifier of the CAG supported by the terminal device. Alternatively, the CAG supported by the terminal device may be a CAG that can be supported by the terminal in a registration area to which the terminal currently belongs. In other words, all cells in the registration area to which the terminal currently belongs may support the CAG indicated by the CAG identifier of the CAG supported by the terminal device. After the terminal moves out of the current registration area, the CAG that can be supported by the terminal may be different from the CAG indicated by the CAG identifier of the CAG supported by the terminal device. Alternatively, the CAG that can be supported by the terminal may be a CAG that can be supported by the terminal in a tracking area to which the terminal currently belongs. In other words, all cells in the tracking area to which the terminal currently belongs may support the CAG indicated by the CAG identifier of the CAG supported by the terminal device. After the terminal moves out of the current tracking area, the CAG that can be supported by the terminal may be different from the CAG indicated by the CAG identifier of the CAG supported by the terminal device.

It may be understood that the NPN identifier of the NPN supported by the terminal device may be a PLMN granularity, a TAI granularity, or a TAC granularity. To be specific, in the first message, one or more PLMNs, TAIs, or TACs each include the NPN identifier that corresponds to the PLMN, the TAI, or the TAC and that is of the NPN supported by the terminal device.

It may be understood that the NS indicated by the NS indication information of the NS supported by the terminal device may be a MAIN granularity, a TAI granularity, or a TAC granularity. To be specific, in the first message, one or more PLMNs, TAIs, or TACs each include the NS corresponds to the PLMN, the TAI, or the TAC.

It may be understood that the CAG identifier of the CAG supported by the terminal device may be a PLMN granularity, a TAI granularity, or a TAC granularity. To be specific, in the first message, one or more PLMNs, TAIs, or TACs each include the CAG identifier that corresponds to the PLMN, the TAI, or the TAC and that is of the CAG supported by the terminal device.

Optionally, in different scenarios, content included in the first message may also be different. The following uses two scenarios as examples to describe content included in the first message in the two scenarios.

In one scenario, for example, in an SNPN scenario, the first message may include the correspondence between the NPN identifier of the NPN supported by the terminal device and the NS indication information of the NS supported by the terminal device. Optionally, the correspondence may be a correspondence between the NPN indicated by the NPN identifier of the NPN supported by the terminal device and the NS indicated by the NS indication information of the NS supported by the terminal device. Alternatively, the correspondence may indicate the NS that is included in the NPN indicated by the NPN identifier of the NPN supported by the terminal device and that is indicated by the NS indication information of the NS supported by the terminal device. Alternatively, the correspondence may indicate the NS that can be supported by the NPN indicated by the NPN identifier of the NPN supported by the terminal device and that is indicated by the NS indication information of the NS supported by the terminal device.

Optionally, the first message may alternatively include at least one of the following: the NPN identifier of the NPN supported by the terminal device, the NS indication information of the NS supported by the terminal device, the NPN identifier of the NPN supported by the access network device, the NS indication information of the NS supported by the access network device, the NPN identifier of the NPN supported by the core network device, the NS indication information of the NS supported by the core network device, the correspondence between the NPN identifier of the NPN supported by the core network device and the NS indication information of the NS supported by the core network device, or the correspondence between the NPN identifier of the NPN supported by the access network device and the NS indication information of the NS supported by the access network device.

It may be understood that the correspondence between the NPN identifier and the NS indication information may be a correspondence between a group of NPN identifiers and the NS indication information, or the correspondence between the NPN identifier and the NS indication information may be a correspondence between a plurality of groups of NPN identifiers and the NS indication information. This is not limited in this application.

In the other scenario, for example, in an NSNPN scenario, the first message may include the correspondence between the CAG identifier of the CAG supported by the terminal device and the NS indication information of the NS supported by the terminal device. Optionally, the correspondence may be a correspondence between the CAG indicated by the CAG identifier of the CAG supported by the terminal device and the NS indicated by the NS indication information of the NS supported by the terminal device. Alternatively, the correspondence may indicate the NS that is included in the CAG indicated by the CAG identifier of the CAG supported by the terminal device and that is indicated by the NS indication information of the NS supported by the terminal device. Alternatively, the correspondence may indicate the NS that can be supported by the CAG indicated by the CAG identifier of the CAG supported by the terminal device and that is indicated by the NS indication information of the NS supported by the terminal device.

Optionally, the first message may alternatively include at least one of the following: the CAG identifier of the CAG supported by the final device or the NS indication information of the NS supported by the terminal device.

Optionally, the first message may alternatively include at least one of the following: the CAG identifier of the CAG supported by the first access network device, the NS indication information of the NS supported by the first access network device, or the correspondence between the CAG identifier of the CAG supported by the first access network device and the NS indication information of the NS supported by the first access network device.

Optionally, the first message may alternatively include at least one of the following: the CAG identifier of the CAG supported by the core network device, the NS indication information of the NS supported by the core network device, or the correspondence between the CAG identifier of the CAG supported by the core network device and the NS indication information of the NS supported by the core network device.

It may be understood that the correspondence between the CAG identifier and the NS indication information may be a correspondence between a group of CAG identifiers and the NS indication information, or the correspondence between the CAG identifier and the NS indication information may be a correspondence between a plurality of groups of CAG identifiers and the NS indication information. This is not limited in this application.

Step S250: The terminal device receives a second message from the first access network device. The second message may include the CAG identifier of the CAG supported by the first access network device, or the second message may include the NPN identifier of the NPN supported by the first access network device.

Optionally, the CAG identifier of the CAG supported by the first access network device may be the same as the CAG identifier of the CAG supported by the first access network device in the interface setup request. The CAG identifier of the CAG supported by the first access network device may alternatively be a CAG that is determined or modified by the first access network device based on the CAG identifier of the CAG supported by the core network device and that is supported by the first access network device or a serving cell of the first access network device.

Optionally, the NPN identifier of the NPN supported by the first access network device may be the same as the NPN identifier of the NPN supported by the first access network device in the interface setup request. The NPN identifier of the NPN supported by the first access network device may alternatively be an NPN that is determined or modified by the first access network device based on the NPN identifier of the NPN supported by the core network device and that is supported by the first access network device or a serving cell of the first access network device.

In a scenario, for example, in an SNPN scenario, the second message may include the NPN identifier of the NPN supported by the first access network device. In another scenario, for example, in an NSNPN scenario, the second message may include the CAG identifier of the CAG supported by the first access network device.

Step S260: The terminal device determines the NS supported by the first access network device. Optionally, the terminal device may determine, based on the first message and the second message, the NS supported by the first access network device.

For example, in a scenario, for example, in an SNPN scenario, when the first message includes the correspondence between the NPN identifier of the NPN supported by the terminal device and the NS indication information of the NS supported by the terminal device, and the second message includes the NPN identifier of the NPN supported by the first access network device, if the NPN identifier of the NPN supported by the first access network device is the same as the NPN identifier of the NPN supported by the terminal device, the terminal device may determine, based on the correspondence between the NS indication information of the NS supported by the terminal device and the NPN identifier of the NPN supported by the terminal device in the first message and the NPN identifier of the NPN supported by the first access network device in the second message, the NS supported by the first access network device or the current serving cell. For example, the correspondence that is between the NPN identifier of the NPN supported by the terminal device and the NS indication information of the NS supported by the terminal device and that is included in the first message is as follows: An NPN 1 corresponds to an NS a, an NS b, and an NS c; an NPN 2 corresponds to an NS d, an NS e, and an NS f. In addition, the NPN that is indicated by the NPN identifier of the NPN supported by the first access network device and that is included in the second message is the NPN 1. In this case, the terminal device may determine that the NS that can be supported by the first access network device or the current serving cell corresponds to the NS a, the NS b, and the NS c.

For example, in another scenario, for example, in an NSNPN scenario, when the first message includes the correspondence between the CAG identifier of the CAG supported by the terminal device and the NS indication information of the NS supported by the terminal device, and the second message includes the CAG identifier of the CAG supported by the first access network device, if the CAG identifier of the CAG supported by the first access network device is the same as the CAG identifier of the CAG supported by the terminal device, the terminal device may determine, based on the correspondence between the NS indication information of the NS supported by the terminal device and the CAG identifier of the CAG supported by the terminal device in the first message and the CAG identifier of the CAG supported by the first access network device in the second message, the NS supported by the first access network device or the current serving cell. For example, the correspondence that is between the CAG identifier of the CAG supported by the terminal device and the NS indication information of the NS supported by the terminal device and that is included in the first message is as follows: A CAG 1 corresponds to an NS a, an NS b, and an NS C; a CAG 2 corresponds to an NS d, an NS e, and an NS f. In addition, the CAG that is indicated by the CAG identifier of the CAG supported by the first access network device and that is included in the second message is the CAG 1. In this case, the terminal device may determine that the NS that can be supported by the first access network device or the current serving cell corresponds to the NS a, the NS b, and the NS c.

The terminal device may determine, based on the correspondence between the NPN identifier and the NS indication information in the first message and the NPN identifier of the NPN supported by the first access network device in the second message, the NS supported by the first access network device. Alternatively, the terminal device may determine, based on the correspondence between the CAG identifier and the NS indication information in the first message and the CAG identifier of the CAG supported by the first access network device in the second message, the NS supported by the first access network device. In this way, the terminal device may learn of the NS supported by the access network device, so that the terminal device accesses a corresponding network and provides a service.

Figure 3A:
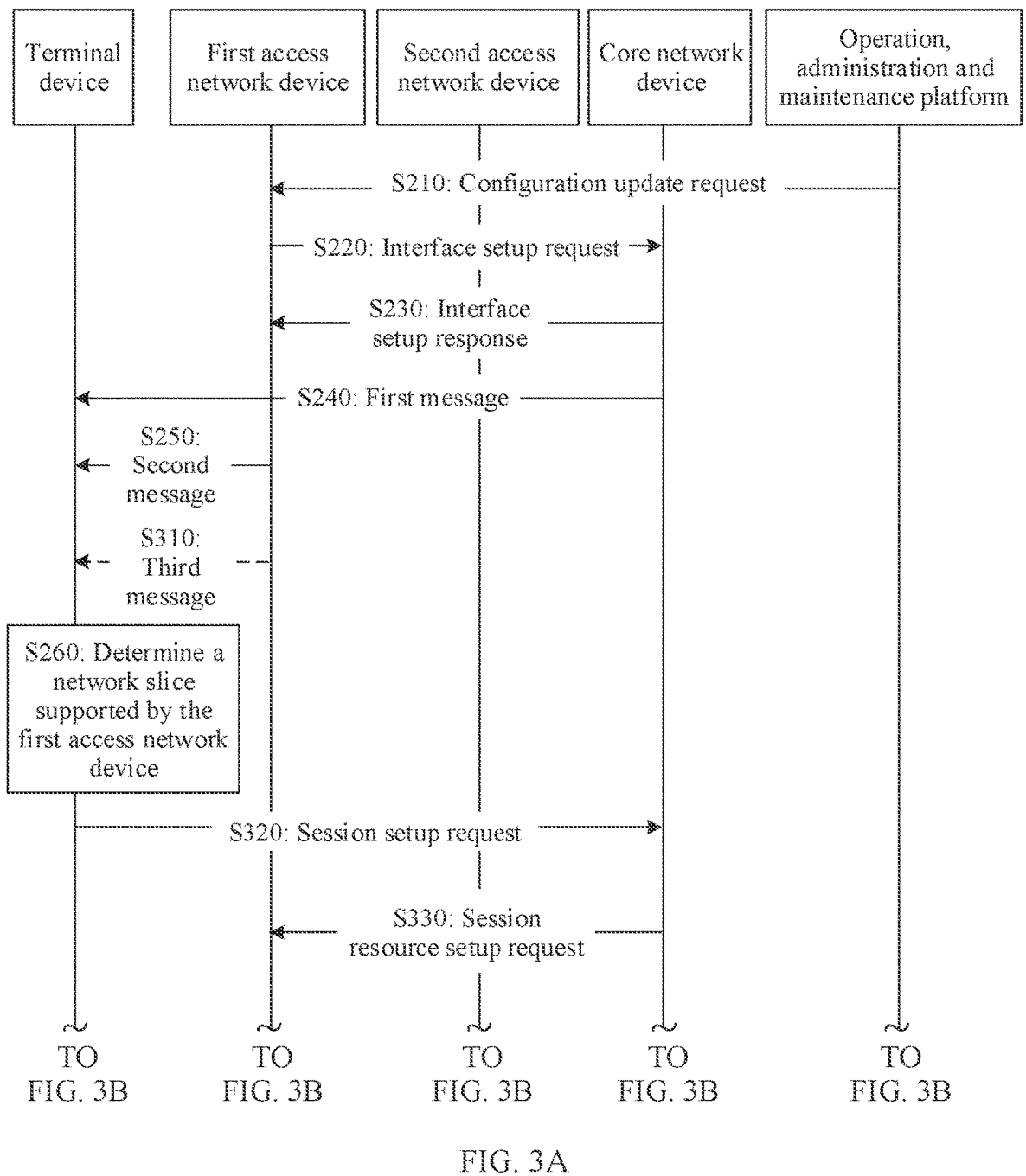
FIG. 3A and FIG. 3B are a schematic flowchart of a communication method according to another embodiment of this application.
Figure 3B:
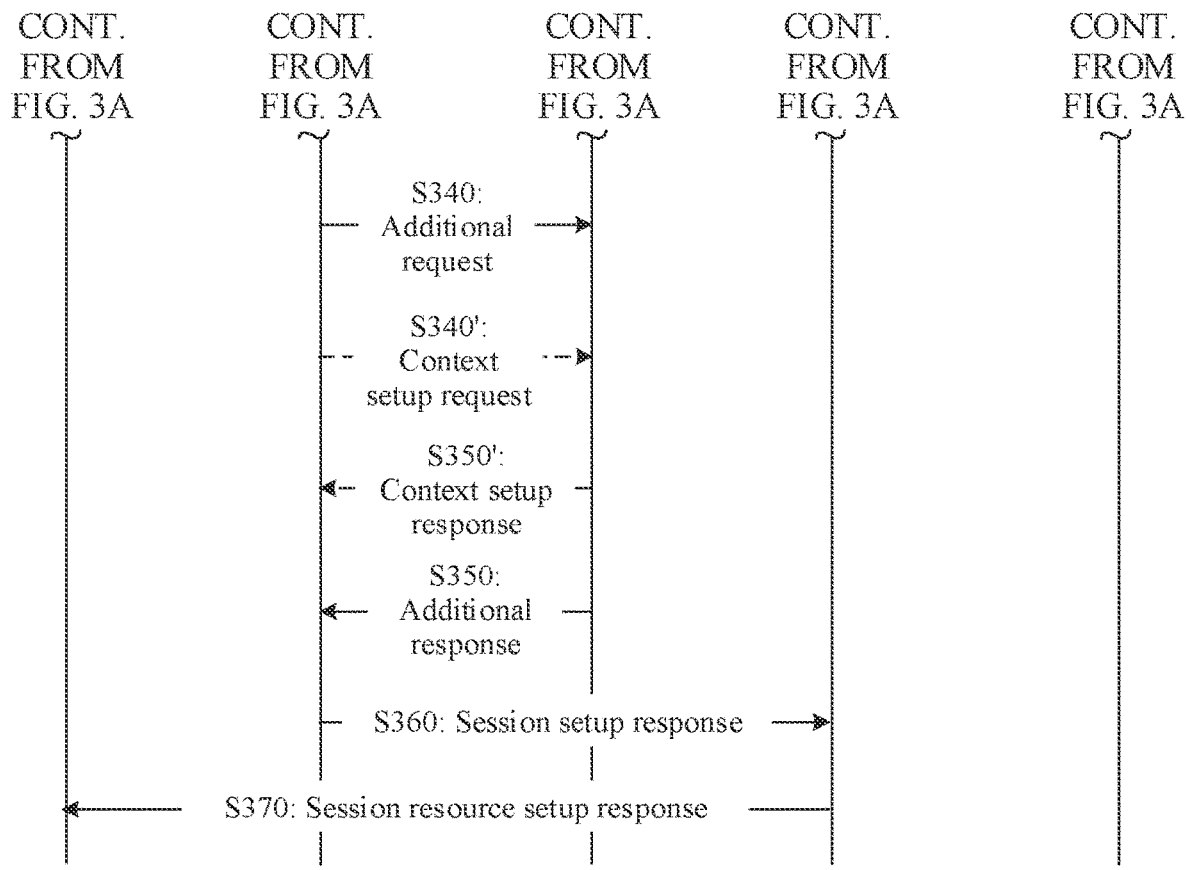

FIG. 3A and FIG. 3B are a schematic flowchart of a communication method 300 from a device interaction perspective according to another embodiment of this application. As shown in the figure, the method may include step S210 to step S260, and step S310 to step S370. The steps in the method are described in detail below. For step S210 to step S260, refer to descriptions of step S210 to step S260 in the provided communication method 200 in FIG. 2. Details are not described herein again.

Step S310: A first access network device sends a third message to a terminal device, where the third message and a second message may be sent together in a same message, or may be separately sent as two messages. For example, the second message may be sent in a SIB 1 or a master information block message (master information block, NUB) (namely, a minimum system message). The third message may be sent in a SIB 4 or a SIB 9, that is, the third message is sent only when the terminal device requests the access network device. Alternatively, both the second message and the third message are sent in a minimum system message, or the second message and the third message are simultaneously sent in another SIB message, for example, a SIB 4 or a SIB 9. This is not limited in this application.

Optionally, the third message may include identification information of a cell. The cell identifier may be a first cell, the first cell may be a neighboring cell of a current serving cell, the first cell may also belong to a second access network device, and the second access network device may be an access network device adjacent to the first access network device.

Optionally, a cell identifier may be a PCI, or may be a cell global identifier, or may be another identifier form. This is not limited in this application.

Optionally, the third message may alternatively include identification information of a plurality of cells, and a plurality of cell identifiers may alternatively be identifiers of neighboring cells of a cell on which the terminal device camps.

Optionally, the third message may alternatively include one or more CAG identifiers. The CAG identifier may be a CAG identifier corresponding to an identifier of a neighboring cell of a cell on which the terminal device camps.

Optionally, the third message may alternatively include one or more NPN identifiers. The NPN identifier may be an NPN identifier corresponding to an identifier of a neighboring cell of a cell on which the terminal device camps.

Optionally, the third message may alternatively include capability information of the second access network device or the first cell, the capability information of the second access network device is used to indicate capability information of whether the second access network device can be used as a secondary access network device, and the second access network device is an access network device in which the first cell is located. The capability information of the first cell is used to indicate whether the first cell can be used as a second serving cell to serve a user.

Optionally, the capability information of whether the second access network device can be used as the secondary access network device may indicate whether there is an interface connection between the second access network device and the first access network device.

Optionally, when there is an interface between the first access network device and the second access network device, the second access network device can be used as the secondary access network device to serve the terminal device.

Optionally, the capability information of the first cell may indicate whether the first cell and the current serving cell belong to a same access network device. If the first cell and the current serving cell belong to the same access network device, the first cell may be used as the second serving cell of the terminal device, that is, the currently serving access network device may use a carrier aggregation manner to enable the current serving cell and the first cell to simultaneously serve the terminal device. If the first cell and the current serving cell do not belong to a same access network device, it needs to be determined whether there is a direct interface between the access network device to which the first cell belongs and the access network device to which the current serving cell belongs. If there is the direct interface, the first cell may be used as the second serving cell of the terminal device. That is, the current access network device may add the access network device to which the first cell belongs as the secondary access network device, so that the current serving cell and the first cell simultaneously serve the terminal device in a dual-connectivity manner.

The terminal device may receive information, about the first cell of the first access network device, sent from the first access network device, or may receive information, about a cell of the second access network device, sent from the first access network device. After receiving information about a plurality of cells, the terminal device may measure a cell specified by the first access network device, so that the terminal device obtains more services, and diversified service requirements of the terminal device are met.

Optionally, step S310 and step S240 may be jointly implemented, or step S310 and step S240 may be independently implemented. This is not limited in this application.

The terminal device may determine, based on the CAG identifier or the NPN identifier in step S250 and/or step S310, the NS supported by the first access network device and/or the second access network device. Further, a packet data unit (packet data unit, PDU) session corresponding to the NS supported by the first access network device or the second access network device may be initiated.

Step S320: The terminal device sends a session setup request to the core network device, where the session setup request includes a registered user of the NS corresponding to the session. The session setup request may farther include a session identifier and an NS identifier corresponding to the session identifier.

Step S230: The first access network device receives a session resource setup request sent by the core network device, where the session resource setup request includes the registered user of the NS corresponding to the session identifier, and the session resource setup request may further include the session identifier and the NS identifier corresponding to the session identifier.

By using the registered user of the NS corresponding to the session, the first access network device may learn of specific cells or specific base stations can be accessed by the terminal device. If the first access network device cannot provide a service of the NS corresponding to the session identifier for the current terminal device, the first access network device needs to search for a neighboring cell access network device that supports the service of the NS corresponding to the session identifier as a secondary access network device, to provide a corresponding service requirement for the current terminal device.

Optionally, when the first access network device can provide the service of the NS corresponding to the session identifier for the terminal device, step S340 and step S350 do not need to be performed.

Optionally, when the first access network device cannot provide the service of the NS corresponding to the session identifier for the terminal device, step S340 and step S350 are performed.

Optionally, in step S340, the first access network device sends an additional request to the second access network device. The additional request includes the registered user of the NS corresponding to the session. The additional request may further include the session identifier and the NS identifier corresponding to the session identifier. The additional request may further include information about a cell that can be accessed by the terminal device. The information about the cell may be measurement report information, or the information about the cell may be identification information of the cell.

Specifically, if the first access network device cannot set up the service of the NS corresponding to the session identifier, the first access network device needs to send the additional request to another access network device. The system information in step S260 includes the capability information of the second access network device, namely, the capability information of whether the second access network device can be used as the secondary access network device. The first access network device determines, based on the system information, that the second access network device can be used as the secondary access network device. That is, the second access network device can provide the service of the NS corresponding to the session identifier for the terminal device.

The second access network device may learn of, by using the registered user of the NS corresponding to the session, whether the current terminal device is a registered terminal device corresponding to the NS corresponding to the session. In addition, the second access network device may learn of, by using the registered user of the NS corresponding to the session, specific access network devices that can be accessed by the terminal device, to set up a PDU session corresponding to the corresponding NS.

Optionally, in step S350, the first access network device receives an additional response from the second access network device. The additional response may be used to indicate that the session may be set up between the terminal device and the second access network device in the corresponding NS.

It may be understood that, in a scenario, to be specific, the first access network device is a primary access network device, and the second access network device may be used as a secondary access network device, a requirement of the terminal device for a service of a corresponding NS may be implemented by using the foregoing step S340 and step S350. In another scenario, the access network device is divided into two parts, namely, a central unit and a distributed unit. The central unit may replace the first access network device, and the distributed processing unit may replace the second access network device. In other words, step S340 may be replaced by step S340', and step S350 may also be replaced by step S350', as shown by a dashed line part in FIG. 3A and FIG. 3B.

Optionally, in step S340', the central unit of the first access network device sends a context setup request to the distributed unit of the first access network device. The context setup request includes an identifier, of a bearer, corresponding to the session that needs to be set up and an NS identifier corresponding to the bearer. Optionally, the context setup request may alternatively include the registered user of the NS corresponding to the session and the NS identifier corresponding to the session identifier.

Specifically, if the central unit of the first access network device cannot set up the service of the NS corresponding to the session identifier, the first access network device needs to send the context setup request to the distributed unit of the first access network device.

The distributed unit of the first access network device may learn of, by using the registered user of the NS corresponding to the session, whether the current terminal device is a registered terminal device corresponding to the NS corresponding to the session. In addition, the distributed unit of the first access network device may learn of, by using the registered user of the NS corresponding to the session, specific cells can be accessed by the terminal device, to set up the PDU session corresponding to the corresponding NS.

Optionally, in step S350', the central unit of the first access network device receives a context setup response sent by the distributed unit of the first access network device. The context setup response may be used to indicate that the session may be set up between the terminal device and the distributed unit of the first access network device in the corresponding NS.

Step S360: The access network device sends a session setup response to the core network device. The session setup response may be used to indicate that the first access network device or the second access network device may provide the session corresponding to the corresponding NS for the terminal device.

Step S370: The terminal device receives the session resource setup response sent by the core network device. The session resource setup response is used to indicate that the terminal device may set up the session corresponding to the corresponding NS.

The terminal device sends the NS supported by the first access network device and/or the NS supported by the second access network device by using the NS supported by the first access network device, so that the terminal device can set up the PDU session in the NS supported by the first access network device or the second access network device. Therefore, data transmission between the terminal device and the access network device is implemented.

It should be understood that sequence numbers of the processes do not mean execution sequences in the foregoing embodiments. The execution sequences of the processes should be determined based on functions and internal logic of the processes, and should not constitute any limitation on the implementation processes in the embodiments of this application.

The foregoing describes in detail the communication methods provided in the embodiments of this application with reference to FIG. 2 and FIG. 3A and FIG. 313. The following describes in detail communication apparatuses provided in the embodiments of this application with reference to FIG. 4 to FIG. 11.

Figure 4:
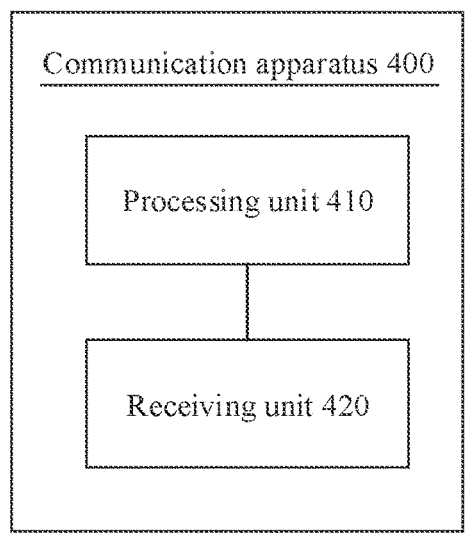
FIG. 4 is a schematic block diagram of a communication apparatus according to an embodiment of this application.

FIG. 4 is a schematic block diagram of a communication apparatus according to an embodiment of this application. As shown in the figure, the communication apparatus 400 may include a processing unit 410 and a receiving unit 420.

The receiving unit 420 is configured to receive a first message from a core network device, where the first message includes a correspondence between network slice NS indication information of an NS supported by a terminal device and a non-public network NPN identifier of an NPN supported by the terminal device.

The receiving unit 420 is further configured to receive a second message from a first access network device, where the second message is used to indicate an NPN identifier of an NPN supported by the first access network device.

The processing unit 410 is configured to determine an NS supported by the first access network device.

Optionally, the receiving unit is further configured to receive a system message SIB from the first access network device, where the SIB includes identification information of a cell, and the cell is a neighboring cell of a cell on which the terminal device camps.

Optionally, the SIB further includes the NPN identifier corresponding to the cell.

Optionally, the SIB further includes capability information of a second access network device, the capability information is used to indicate capability information of whether the second access network device can be used as a secondary access network device, and the second access network device is an access network device in which the cell is located.

Figure 5:
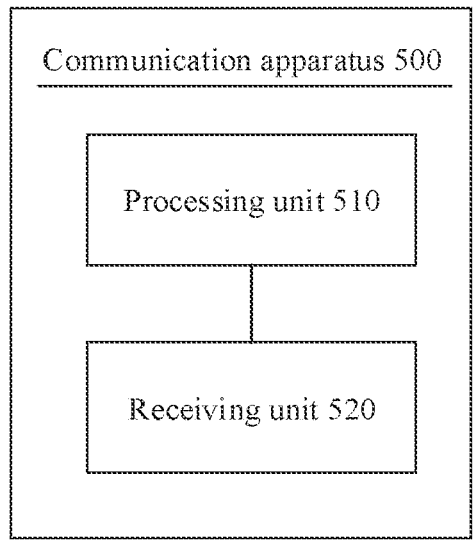
FIG. 5 is a schematic block diagram of a communication apparatus according to another embodiment of this application.

FIG. 5 is a schematic block diagram of a communication apparatus according to an embodiment of this application.

As shown in the figure, the communication apparatus 500 may include a processing unit 510 and a receiving unit 520.

The receiving unit 520 is configured to receive a first message from a core network device, where the first message includes a correspondence between network slice NS indication information of an NS supported by a terminal device and a closed access group CAG identifier of a CAG supported by the terminal device.

The receiving unit 520 is further configured to receive a second message from a first access network device, where the second message is used to indicate a CAG identifier of a CAG supported by the first access network device.

The processing unit 510 is further configured to determine an NS supported by the first access network device.

Optionally, the receiving unit is further configured to receive a system message SIB from the first access network device, where the SIB includes identification information of a cell, and the cell is a neighboring cell of a cell on which the terminal device camps.

Optionally, the SIB further includes the CAG identifier corresponding to the cell.

Optionally, the SIB further includes capability information of a second access network device, the capability information is used to indicate capability information of whether the second access network device can be used as a secondary access network device, and the second access network device is an access network device in which the cell is located.

It should be understood that the communication apparatuses described in FIG. 4 and FIG. 5 may be terminal devices.

The communication apparatus 400 and the communication apparatus 500 provided in this application may correspond to processes performed by the terminal devices in the method embodiments in FIG. 2 and FIG. 3A and FIG. 3B.

Figure 6:
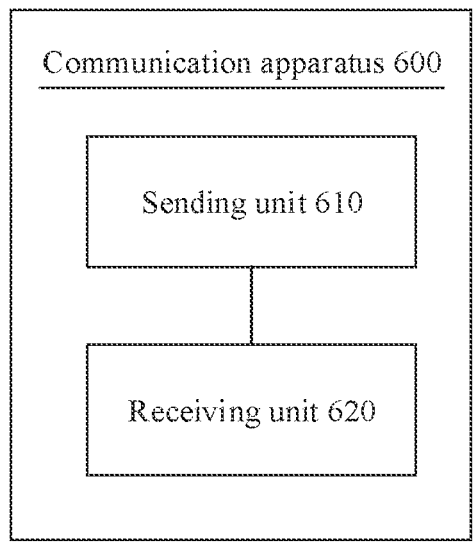
FIG. 6 is a schematic block diagram of a communication apparatus according to another embodiment of this application.

FIG. 6 is a schematic block diagram of a communication apparatus according to an embodiment of this application. As shown in the figure, the communication apparatus 600 may include a sending unit 610 and a receiving unit 620.

The receiving unit 620 is configured to obtain a non-public network NPN identifier of an NPN supported by a first access network device.

The sending unit 610 is further configured to send a second message to a terminal device, where the second message is used to indicate the NPN identifier of the NPN supported by the first access network device.

Optionally, the sending unit 610 is further configured to send a system message SIB to the terminal device, where the SIB includes identification information of a cell, and the cell is a neighboring cell of a cell on which the terminal device camps.

Optionally, the SIB further includes the NPN identifier corresponding to the cell.

Optionally, the SIB further includes capability information of a second access network device, the capability information is used to indicate capability information of whether the second access network device can be used as a secondary access network device, and the second access network device is an access network device in which the cell is located.

Figure 7:
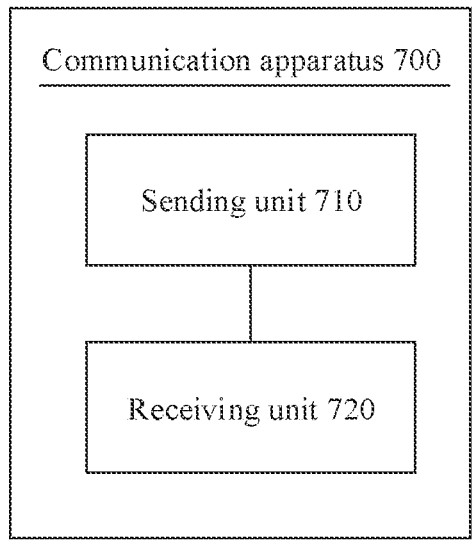
FIG. 7 is a schematic block diagram of a communication apparatus according to another embodiment of this application.

FIG. 7 is a schematic block diagram of a communication apparatus according to an embodiment of this application. As shown in the figure, the communication apparatus 700 may include a sending unit 70 and a receiving unit 720.

The receiving unit 720 is configured to obtain a closed access group CAG identifier of a CAG supported by a first access network device.

The sending unit 710 is configured to send a second message to a terminal device, where the second message is used to indicate the CAG identifier of the CAG supported by the first access network device.

Optionally, the sending unit 710 is further configured to send a system message SIB to the terminal device, where the SIB includes identification information of a cell, and the cell is a neighboring cell of a cell on which the terminal device camps.

Optionally, the SIB further includes the CAG identifier corresponding to the cell.

Optionally, the SIB further includes capability information of a second access network device, the capability information is used to indicate capability information of whether the second access network device can be used as a secondary access network device, and the second access network device is an access network device in which the cell is located.

It should be understood that the communication apparatuses described in FIG. 6 and FIG. 7 may be first access network devices.

The communication apparatus 600 and the communication apparatus 700 provided in this application may correspond to processes performed by the first access network devices in the method embodiments in FIG. 2 and FIG. 3A and FIG. 3B.

Figure 8:
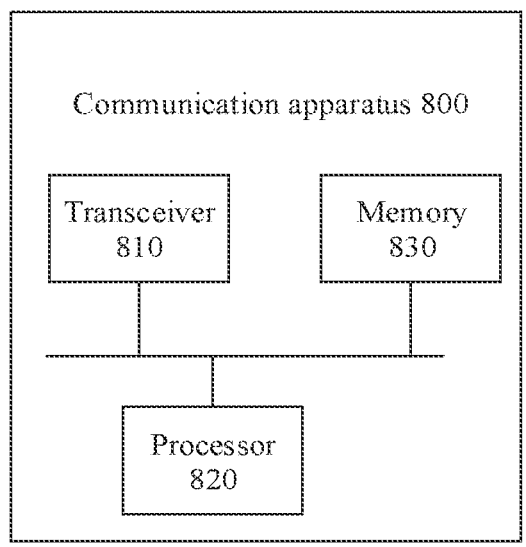
FIG. 8 is a schematic structural diagram of a communication apparatus according to an embodiment of this application.

FIG. 8 is a schematic structural diagram of a terminal device according to another embodiment of this application. A communication apparatus 800 in FIG. 8 may correspond to the foregoing terminal device. As shown in FIG. 8, the communication apparatus 800 includes a transceiver 810, a processor 820, and a memory 830.

FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application, The transceiver 810, the processor 820, and the memory 830 communicate with each other through an internal connection path and transfer a control signal and/or a data signal.

Specifically, the transceiver 810 is configured to: receive a first message from a core network device, where the first message includes a correspondence between network slice NS indication information of an NS supported by a terminal device and a non-public network NPN identifier of an NPN supported by the terminal device; and receive a second message from a first access network device, where the second message is used to indicate an NPN identifier of an NPN supported by the first access network device.

Specifically, the processor 820 is configured to determine an NS supported by the first access network device.

For a specific working process and beneficial effects of the communication apparatus 800, refer to the descriptions in the embodiments shown in FIG. 2 and FIG. 3A and FIG. 3B. Details are not described herein again.

Figure 9:
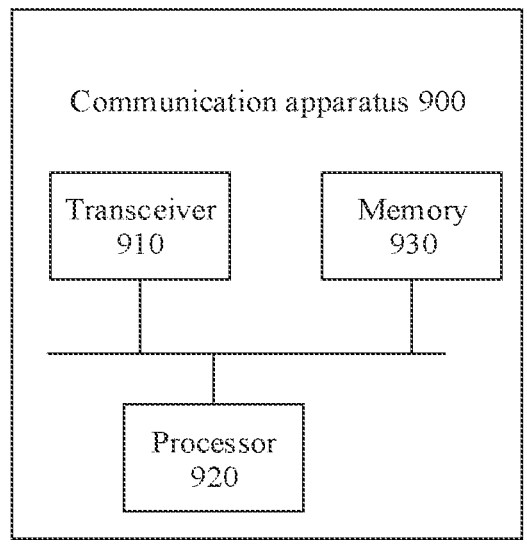
FIG. 9 is a schematic structural diagram of a communication apparatus according to another embodiment of this application.

FIG. 9 is a schematic structural diagram of a terminal device according to another embodiment of this application. A communication apparatus 900 in FIG. 9 may correspond to the foregoing terminal device. As shown in FIG. 9, the communication apparatus 900 includes a transceiver 910, a processor 920, and a memory 930.

FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 910, the processor 920, and the memory 930 communicate with each other through an internal connection path and transfer a control signal and/or a data signal.

Specifically, the transceiver 910 is configured to: receive a first message from a core network device, where the first message includes a correspondence between network slice NS indication information of an NS supported by a terminal device and a non-public network CAG identifier of a CAG supported by the terminal device; and receive a second message from a first access network device, where the second message is used to indicate a CAG identifier of a CAG supported by the first access network device.

Specifically, the processor 920 is configured to determine an NS supported by the first access network device.

For a specific working process and beneficial effects of the communication apparatus 900, refer to the descriptions in the embodiments shown in FIG. 2 and FIG. 3A and FIG. 3B. Details are not described herein again.

Figure 10:
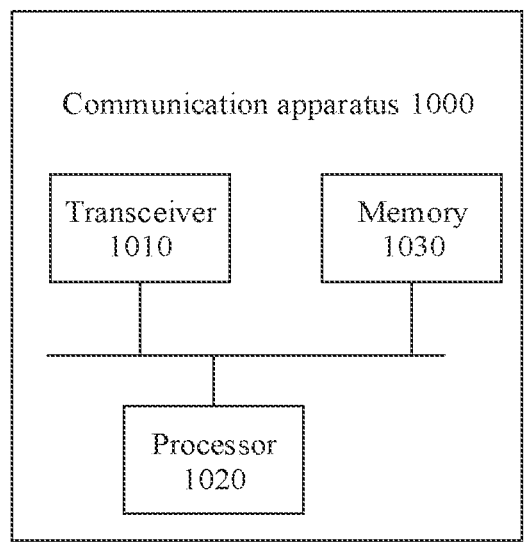
FIG. 10 is a schematic structural diagram of a communication apparatus according to another embodiment of this application.

FIG. 10 is a schematic structural diagram of a terminal device according to another embodiment of this application. A communication apparatus 1000 in FIG. 10 may correspond to the foregoing terminal device. As shown in FIG. 10, the communication apparatus 1000 includes a transceiver 1010, a processor 1020, and a memory 1030.

FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 1010, the processor 1020, and the memory 1030 communicate with each other through an internal connection path and transfer a control signal and/or a data signal.

Specifically, the transceiver 1010 is configured to: obtain a non-public network NPN identifier of an NPN supported by a first access network device; and send a second message to a terminal device, where the second message is used to indicate the NPN identifier of the NPN supported by the first access network device.

For a specific working process and beneficial effects of the communication apparatus 1000, refer to the descriptions in the embodiments shown in FIG. 2 and FIG. 3A and FIG. 3B, Details are not described herein again.

Figure 11:
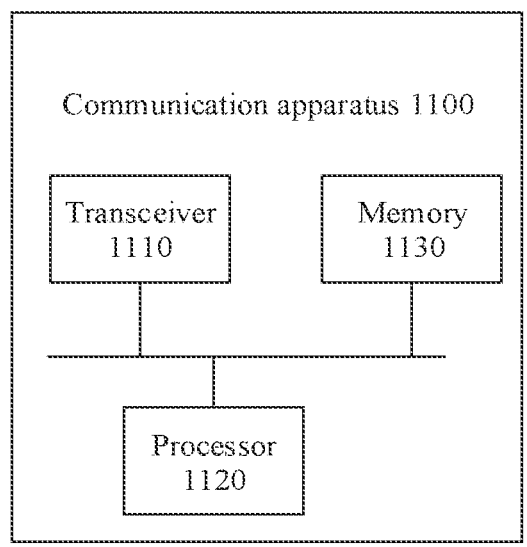
FIG. 11 is a schematic structural diagram of a communication apparatus according to another embodiment of this application.

FIG. 11 is a schematic structural diagram of a terminal device according to another embodiment of this application. A communication apparatus 1100 in FIG. 11 may correspond to the foregoing terminal device. As shown in FIG. 11, the communication apparatus 1100 includes a transceiver 1110, a processor 1120, and a memory 1130.

FIG. 11 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 1110, the processor 1120, and the memory 1130 communicate with each other through an internal connection path and transfer a control signal and/or a data signal.

Specifically, the transceiver 1110 is configured to: obtain a closed access group CAG identifier of a CAG supported by a first access network device; and send a second message to a terminal device, where the second message is used to indicate the CAG identifier of the CAG supported by the first access network device.

For a specific working process and beneficial effects of the communication apparatus 1100, refer to the descriptions in the embodiments shown in FIG. 2 and FIG. 3A and FIG. 3B. Details are not described herein again.

The transceiver in the embodiments of this application may also be referred to as a transceiver unit, a transceiver machine, a transceiver apparatus, or the like. The processor may also be referred to as a processing unit, a processing board, a processing module, a processing apparatus, or the like. Optionally, a component that is in the transceiver and that is configured to implement a receiving function may be considered as a receiving unit, and a component that is in the transceiver and that is configured to implement a sending function may be considered as a sending unit. In other words, the transceiver includes the receiving unit and the sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

The memory described in the embodiments of this application is configured to store computer instructions and a parameter for running the processor.

The processor in the embodiments of this application may be an integrated circuit chip, and has a signal processing capability. In an implementation process, steps in the foregoing method can be implemented by using a hardware integrated logic circuit in the processor or by using instructions in a form of software. The processor in the embodiments of this application may be a general-purpose processor, a digital signal processor (digital signal processor, DSP), an application-specific integrated circuit (application specific integrated circuit ASIC), a field programmable gate array (field programmable gate array, FPGA) or another programmable logic device, a discrete gate or transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. Steps of the methods disclosed with reference to the embodiments of this application may be directly performed and completed by a hardware decoding processor, or may be performed and completed by using a combination of hardware and software modules in the decoding processor. A software module may be located in a mature storage medium in the art, such as a random access memory (random access memory, RAM), a flash memory, a read-only memory (read-only memory, ROM), a programmable read-only memory, an electrically erasable programmable memory, a register, or the like. The storage medium is located in the memory, and the processor reads the instructions from the memory and completes the steps of the foregoing methods in combination with hardware in the processor.

Sequence numbers of the processes do not mean execution sequences in the embodiments of this application. The execution sequences of the processes should be determined based on functions and internal logic of the processes, and should not constitute any limitation on the implementation processes in the embodiments of this application.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid state disk, SSD)), or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
sending, by a first access network device, an interface setup request to a core network device, wherein the interface setup request includes a correspondence between network slice (NS) indication information and a non-public network (NPN) identifier;
receiving, by the first access network device, an interface setup response from the core network device, wherein the interface setup response includes an NPN identifier of an NPN supported by the core network device;
obtaining, by the first access network device based on the interface setup response, a NPN identifier of an NPN supported by the first access network device; and
sending, by the first access network device, a second message to a terminal device, wherein the second message is used to indicate the NPN identifier of the NPN supported by the first access network device, and the second message is used by the terminal device to determine a NS corresponding to the NPN supported by the first access network device.

2. The method according to claim 1, wherein the method further comprises:
sending, by the first access network device, a system information block (SIB) to the terminal device, wherein the SIB comprises identification information of a cell, and wherein the cell is a neighboring cell of a cell on which the terminal device camps.

3. The method according to claim 2, wherein the SIB further comprises the NPN identifier corresponding to the cell or a closed access group (CAG) identifier corresponding to the cell.

4. The method according to claim 2, wherein the SIB further comprises capability information of a second access network device, wherein the capability information is used to indicate whether the second access network device can be used as a secondary access network device, and wherein the second access network device is an access network device in which the cell is located.

5. The method according to claim 1, wherein the correspondence includes a correspondence between at least one group of NPN identifiers and the NS indication information.

6. A communication method, comprising:
sending, by a first access network device, an interface setup request to a core network device, wherein the interface setup request includes a correspondence between network slice (NS) indication information and a closed access group (CAG) identifier;
receiving, by the first access network device, an interface setup response from the core network device, wherein the interface setup response includes a CAG identifier of a CAG supported by the core network device;
obtaining, by the first access network device based on the interface setup response, a CAG identifier of a CAG supported by the first access network device; and
sending, by the first access network device, a second message to a terminal device, wherein the second message is used to indicate the CAG identifier of the CAG supported by the first access network device, and the second message is used by the terminal device to determine a NS corresponding to the CAG supported by the first access network device.

7. The method according to claim 6, wherein the method further comprises:
sending, by the first access network device, a system information block (SIB) to the terminal device, wherein the SIB comprises identification information of a cell, and wherein the cell is a neighboring cell of a cell on which the terminal device camps.

8. The method according to claim 7, wherein the SIB further comprises a non-public network (NPN) identifier corresponding to the cell or the CAG identifier corresponding to the cell.

9. The method according to claim 7, wherein the SIB further comprises capability information of a second access network device, wherein the capability information is used to indicate whether the second access network device can be used as a secondary access network device, and wherein the second access network device is an access network device in which the cell is located.

10. The method according to claim 6, wherein the correspondence includes a correspondence between at least one group of CAG identifiers and the NS indication information.

11. A communication apparatus, comprises:
at least one processor; and
one or more memories coupled to the at least one processor and storing programming instructions for execution by the at least one processor to perform operations comprising:
sending an interface setup request to a core network device, wherein the interface setup request includes a correspondence between network slice (NS) indication information and a non-public network (NPN) identifier;
receiving an interface setup response from the core network device, wherein the interface setup response includes an NPN identifier of an NPN supported by the core network device;
obtaining, based on the interface setup response, a NPN identifier of an NPN supported by the communication apparatus; and sending a second message to a terminal device, wherein the second message is used to indicate the NPN identifier of the NPN supported by the communication apparatus, and the second message is used by the terminal device to determine a NS corresponding to the NPN supported by the communication apparatus.

12. The apparatus according to claim 11, wherein the programming instructions are for execution by the at least one processor to send a system information block (SIB) to the terminal device, wherein the SIB comprises identification information of a cell, and wherein the cell is a neighboring cell of a cell on which the terminal device camps.

13. The apparatus according to claim 12, wherein the SIB further comprises the NPN identifier corresponding to the cell or a closed access group (CAG) identifier corresponding to the cell.

14. The apparatus according to claim 12, wherein the SIB further comprises capability information of a second access network device, wherein the capability information is used to indicate whether the second access network device can be used as a secondary access network device, and wherein the second access network device is an access network device in which the cell is located.

15. The apparatus according to claim 11, wherein the correspondence includes a correspondence between at least one group of NPN identifiers and the NS indication information.

16. A communication apparatus, comprises:
at least one processor; and
one or more memories coupled to the at least one processor and storing programming instructions for execution by the at least one processor to perform operations comprising:
sending an interface setup request to a core network device, wherein the interface setup request includes a correspondence between network slice (NS) indication information and a closed access group (CAG) identifier;
receiving an interface setup response from the core network device, wherein the interface setup response includes a CAG identifier of a CAG supported by the core network device;
obtaining, based on the interface setup response, a CAG identifier of a CAG supported by the communication apparatus; and
sending a second message to a terminal device, wherein the second message is used to indicate the CAG identifier of the CAG supported by the communication apparatus, and the second message is used by the terminal device to determine a NS corresponding to the CAG supported by the communication apparatus.

17. The apparatus according to claim 16, wherein the programming instructions are for execution by the at least one processor to send a system information block (SIB) to the terminal device, wherein the SIB comprises identification information of a cell, and wherein the cell is a neighboring cell of a cell on which the terminal device camps.

18. The apparatus according to claim 17, wherein the SIB further comprises a non-public network (NPN) identifier corresponding to the cell or the CAG identifier corresponding to the cell.

19. The apparatus according to claim 17, wherein the SIB further comprises capability information of a second access network device, wherein the capability information is used to indicate whether the second access network device can be used as a secondary access network device, and wherein the second access network device is an access network device in which the cell is located.

20. The apparatus according to claim 16, wherein the correspondence includes a correspondence between at least one group of CAG identifiers and the NS indication information.

* * * * *